(12) United States Patent
Hoshina

(10) Patent No.: US 7,175,082 B2
(45) Date of Patent: Feb. 13, 2007

(54) CONTACTLESS DATA COMMUNICATION SYSTEM, POSITION INFORMATION MANAGEMENT SYSTEM, CONTACTLESS IDENTIFICATION TAG, DATA COMMUNICATION SYSTEM, CONTACTLESS IDENTIFICATION TAG CONTROL PROGRAM, AND DATA COMMUNICATION SYSTEM CONTROL PROGRAM

(75) Inventor: Masaki Hoshina, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 215 days.

(21) Appl. No.: 10/799,370

(22) Filed: Mar. 12, 2004

(65) Prior Publication Data

US 2004/0251302 A1     Dec. 16, 2004

(30) Foreign Application Priority Data

Mar. 20, 2003   (JP)   ............................. 2003-077642

(51) Int. Cl.
*G06F 19/00* (2006.01)
*G06F 17/00* (2006.01)
*G06Q 30/00* (2006.01)
*G06Q 90/00* (2006.01)
*G08B 13/14* (2006.01)

(52) U.S. Cl. ................. 235/385; 235/375; 235/472.02; 340/572.1; 340/539.13; 340/825.49

(58) Field of Classification Search ................ 235/385, 235/375, 487, 472.02; 340/572.1, 539.13, 340/825.49
See application file for complete search history.

(56) References Cited

U.S. PATENT DOCUMENTS 5,686,902 A * 11/1997 Reis et al. ................. 340/10.2
5,742,237 A *  4/1998 Bledsoe ................. 340/825.49

(Continued)

FOREIGN PATENT DOCUMENTS

JP         2001-101285         4/2001

*Primary Examiner*—Daniel Walsh
(74) *Attorney, Agent, or Firm*—Hogan & Hartson LLP

(57) ABSTRACT

A contactless data communication system includes a contactless identification tag having first identification information inherent to the contactless identification tag and includes a drive power generation means to generate drive power from an electromagnetic wave used for a power supply sent from a data communication system, an acquisition request receiving means, and an identification information sending means. The contactless data communication has a second identification information inherent to the data communication system and includes an electromagnetic wave sending means, an identification information acquisition means, an information sending means, an information acquisition means, and a position information computation means.

18 Claims, 13 Drawing Sheets

U.S. PATENT DOCUMENTS

| | | | |
|---|---|---|---|
| 5,936,527 A * | 8/1999 | Isaacman et al. | 340/572.1 |
| 5,959,568 A * | 9/1999 | Woolley | 342/42 |
| 6,046,683 A * | 4/2000 | Pidwerbetsky et al. | 340/10.4 |
| 6,169,497 B1 * | 1/2001 | Robert | 340/988 |
| 6,456,239 B1 * | 9/2002 | Werb et al. | 342/463 |
| 6,552,661 B1 * | 4/2003 | Lastinger et al. | 340/572.1 |
| 6,601,764 B1 * | 8/2003 | Goodwin, III | 235/385 |
| 6,900,762 B2 * | 5/2005 | Andrews et al. | 342/463 |
| 7,009,526 B2 * | 3/2006 | Hughes et al. | 340/825.49 |
| 7,044,373 B1 * | 5/2006 | Garber et al. | 235/385 |
| 2001/0000019 A1 * | 3/2001 | Bowers et al. | 340/572.1 |
| 2002/0063622 A1 * | 5/2002 | Armstrong et al. | 340/10.31 |
| 2002/0196145 A1 * | 12/2002 | Moore | 340/572.5 |
| 2003/0001725 A1 * | 1/2003 | Moore | 340/10.3 |
| 2003/0141962 A1 * | 7/2003 | Barink | 340/10.42 |
| 2003/0206107 A1 * | 11/2003 | Goff et al. | 340/572.7 |
| 2003/0206115 A1 * | 11/2003 | Krumm et al. | 340/825.49 |
| 2004/0000997 A1 * | 1/2004 | Stevens | 340/572.1 |
| 2004/0008114 A1 * | 1/2004 | Sawyer | 340/572.1 |
| 2004/0095241 A1 * | 5/2004 | Maloney | 340/568.1 |
| 2004/0104817 A1 * | 6/2004 | Wijk | 340/505 |
| 2004/0108954 A1 * | 6/2004 | Richley et al. | 342/387 |
| 2004/0119605 A1 * | 6/2004 | Schaper | 340/825.49 |
| 2004/0144842 A1 * | 7/2004 | Brignone et al. | 235/385 |
| 2004/0174260 A1 * | 9/2004 | Wagner | 340/568.1 |
| 2004/0212479 A1 * | 10/2004 | Gilbert et al. | 340/10.34 |
| 2005/0099302 A1 * | 5/2005 | Lieffort et al. | 340/572.7 |
| 2005/0206523 A1 * | 9/2005 | Engellenner | 340/572.1 |
| 2005/0258240 A1 * | 11/2005 | Chappidi et al. | 235/385 |
| 2005/0280538 A1 * | 12/2005 | Kawai et al. | 340/572.1 |
| 2006/0012476 A1 * | 1/2006 | Markhovsky et al. | 340/539.32 |
| 2006/0012480 A1 * | 1/2006 | Klowak | 340/572.1 |
| 2006/0033609 A1 * | 2/2006 | Bridgelall | 340/10.42 |
| 2006/0038684 A1 * | 2/2006 | Lahiri | 340/572.1 |
| 2006/0071782 A1 * | 4/2006 | Ahmed et al. | 340/539.13 |
| 2006/0076401 A1 * | 4/2006 | Frerfking | 235/380 |
| 2006/0092072 A1 * | 5/2006 | Seiner | 342/46 |
| 2006/0170565 A1 * | 8/2006 | Husak et al. | 340/825.49 |
| 2006/0180665 A1 * | 8/2006 | Garber et al. | 235/385 |

* cited by examiner

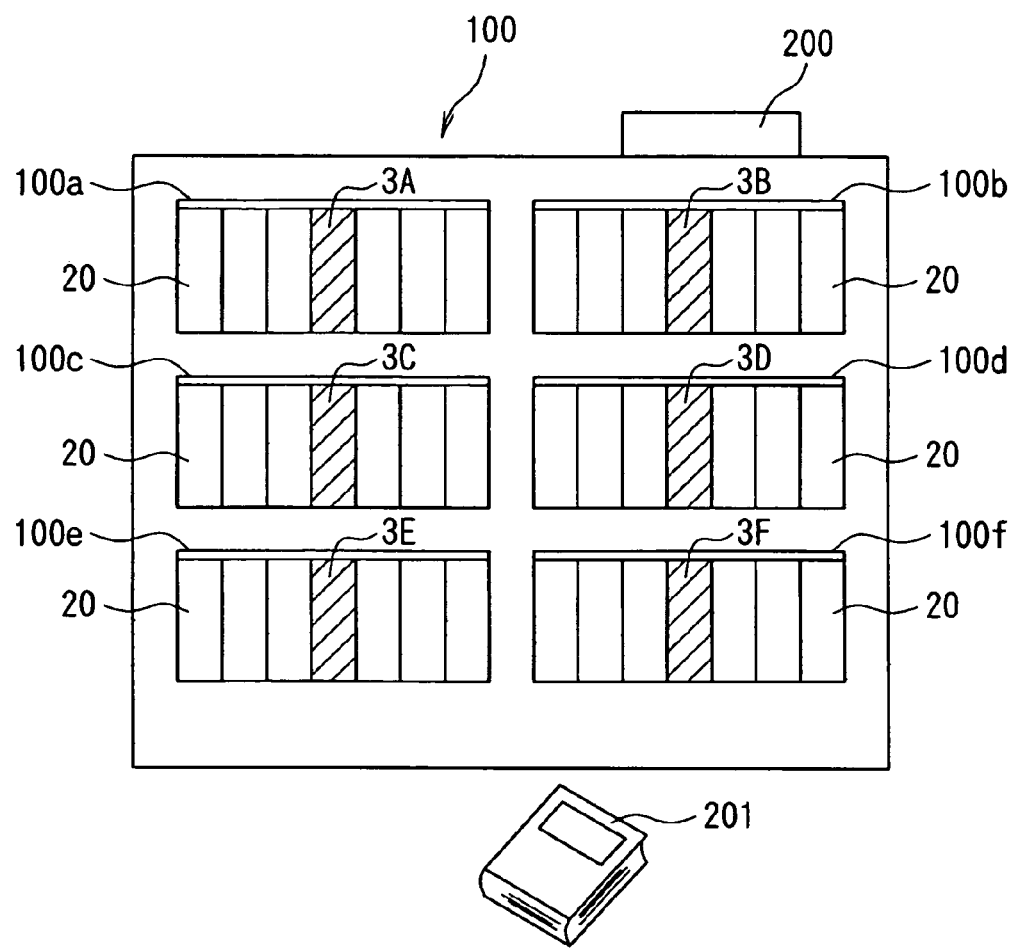
FIG. 2
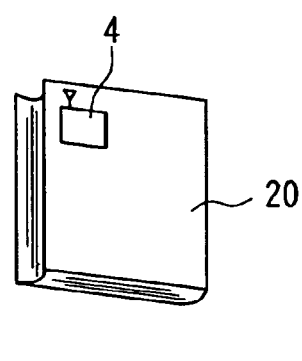
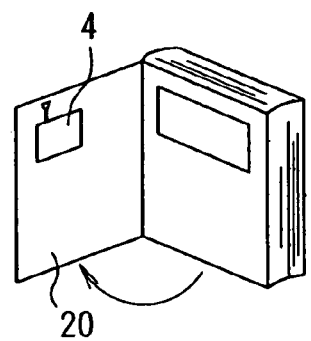
FIG. 3A        FIG. 3B

CONTACTLESS DATA COMMUNICATION SYSTEM, POSITION INFORMATION MANAGEMENT SYSTEM, CONTACTLESS IDENTIFICATION TAG, DATA COMMUNICATION SYSTEM, CONTACTLESS IDENTIFICATION TAG CONTROL PROGRAM, AND DATA COMMUNICATION SYSTEM CONTROL PROGRAM

BACKGROUND OF THE INVENTION

1. Field of the Invention

The present invention relates to a data communication system using a contactless identification tag, and a position information management system to manage position information of a predetermined article by using the data communication system.

2. Description of the Related Art

Conventionally, there has been a system in a library or the like where a wireless IC card is stuck to a book. Information on the IC card located inside an area is read out by a reader/writer installed in each block of a bookshelf, and then the information is sent to a system for book management. Thereby books stored in the bookshelf are managed by the system. In this system, by comparing the shelf number associated to each block of the bookshelf and the shelf number stored in the IC card, it is possible to know whether a book exists in a block having a shelf number.

In the above-described conventional system, detection of whether a book exists in a correct position of a bookshelf or not can be accomplished. However, in cases where a book has fallen near the bookshelf, or a book is placed on top of the bookshelf, the system cannot detect the location of such books, which is near the bookshelf but not stored in the bookshelf.

Accordingly, the present invention has been developed in view of the unsolved problems which conventional technologies have, and an advantage of the invention is to provide a contactless data communication system, a position information management system, a contactless identification tag, a data communication system, a contactless identification tag control program, and a data communication system control program, which are suitable for managing position information of a predetermined article.

SUMMARY OF THE INVENTION

In order to achieve above-described advantage, a contactless data communication system according to the present invention includes a contactless identification tag and a plurality of data communication systems that can be arranged in arbitrary places. The contactless identification tag has first identification information that is the identification information inherent to its own contactless identification tag, and includes a drive power generation device to generate drive power from an eletromagnetic as a power supply, sent from the data communication system, an acquisition request receiving device to receive an acquisition request of first identification information from the data communication system, and an identification information sending device to send the first identification information to the data communication system in response to the acquisition request of the first identification information received by the acquisition request receiving device. Furthermore, the data communication system has second identification information that is the identification information inherent to its own data communication system, and includes an electromagnetic wave sending device as a power supply to send an eletromagnetic for supplying power to the contactless identification tag, an identification information acquisition device to acquire the first identification information from the contactless identification tag, which exists within an area where the communication can be made, an information sending device to send second identification information inherent to its own data communication system and the first identification information acquired by the identification information acquisition device to other data communication systems, an information acquisition device to acquire the second identification information inherent to the other data communication systems and the first identification information acquired in the other data communication systems from the other data communication systems, and a position information computation device to compute position information of the contactless identification tag based on the second identification information and the first identification information acquired from the other data communication systems.

With such a configuration, the contactless identification tag according to a first embodiment: can generate drive power from the electromagnetic wave used as a power supply sent from the data communication system by the drive power generation device; can receive the acquisition request of the first identification information from the data communication system by the acquisition request receiving device; and can send the first identification information to the data communication system by the identification information sending device in response to the acquisition request of the first identification information received by the acquisition request receiving device. Furthermore, the data communication system: can send the eletromagnetic as a power supply to the contactless identification tag by the sending device of an electromagnetic wave for the power supply; can acquire the first identification information from the contactless identification tag, which exists within the area where the communication can be made, by the identification information acquisition device; can send the second identification information inherent to its own data communication system and the first identification information acquired by the identification information acquisition device to the data communication system by the information sending device; can acquire the second identification information inherent to the other data communication systems and the first identification information acquired in the other data communication systems from the other data communication systems by the information acquisition device; and can compute position information of the contactless identification tag based on the second identification information and the first identification information acquired from the other data communication systems by the position information computation means.

Accordingly, by acquiring each identification information and the identification information of the contactless identification tag, which exists within each area where the communication can be made, from the other data communication systems, based on this information, for example, it is possible to compute the approximate position information of the contactless identification tag from the relative position of the data communication system. Accordingly, it is not necessary to arrange the data communication system in a predetermined position and acquire position information after the arrangement, and thereby the rearrangement or the like of the data communication system can be easily carried out.

The contactless identification tag is the one used in a Radio Frequency Identification (RFID) system, and is generally called as a data carrier or the like. There are various kinds of shapes such as a label type, a card type, a coin type, and a stick type. These shapes closely relate to the applications, and, for example, applications that people carry include a card shape, or a key holder shape fabricated from a label shape. As for a semiconductor carrier ID, a stick type is the mainstream. As for the ones sewn to linen-related clothes, a coin type is the mainstream. Moreover, there are ones equipped with a display section in the card type or the like.

The contactless identification tag is equipped with a storage area used for data-read only or where data read/write can be carried out without constraint, and furthermore, there are ones that can be operated by contactless power transfer from an antenna side even if a battery is not provided. Moreover, the RFID system is the ID system which uses a electromagnetic wave and an electromagnetic wave as a medium, wherein the contactless identification tag has three features: (1) of a size easy to carry, (2) of storing information to an electronic circuit, and (3) of communicating by contactless communication.

Accordingly, the RFID system is used for integrating people, an article, a car or the like having the contactless identification tag, and their information. That is, people, an article, and a car can take out required information at any time and in a certain place, and can write in new information as required. Moreover, as for a typical type of RFID, there are four methods as follows: an electromagnetic-coupling method to carry out communication with a contactless identification tag by using mainly mutual induction of a coil by the alternating current magnetic field; an electromagnetic induction method to carry out communication with a contactless identification tag by using mainly an electromagnetic wave of 250 kHz or less, or a long and medium wave band of 13.56 MHz band; a method to carry out data communication between an antenna at the side of a reader/writer and a contactless identification tag by microwave of 2.45 GHz band; and an optical method which arranges LED as a generation source of light, and arranges a photo transistor or the like as an light receiver, and carries out communication with a contactless identification tag by using light transmission in space.

There are four kinds of access methods as follows: a single access mode, a First In First Out (FIFO) access mode, a multi-access mode, and a selective access mode. As for the single access mode, the number of contactless identification tags that exist within an antenna communication range is one, therefore when a plurality of contactless identification tags exist within the antenna communication range, a communication error occurs and thus the communication can not be made.

As for the FIFO access mode, the communication can be made, by turns, with contactless identification tags that enter the communication range of an antenna by turns. Because an access prohibition process is carried out on the contactless identification tag, which finished the communication, even if a plurality of tags, which finished the communication, exists within the communication range of the antenna, the communication can be made if only one new tag enters the communication range of the antenna. However, if contactless identification tags simultaneously enter the communication range, a communication error occurs and thus the communication cannot be made. Once the contactless identification tag, with access that has been prohibited, goes outside the communication range, the communication can be made again.

As for the multi-access mode, the communication with all contactless identification tags can be made, even if a plurality of contactless identification tags exist within the communication range of an antenna. The selective access mode, where the communication can be made with a specific contactless identification tag among a plurality of contactless identification tags, which exists within the communication range, can be made possible by a command to assign a number to the contactless identification tag within the communication range, and a command to carry out the communication with a specific contactless identification tag based on the assigned number.

As for a second embodiment of the present invention, in addition to the first embodiment, a specific data communication system, which is selected among the plurality of data communication systems, acquires the second identification information inherent to the other data communication systems and the first identification information acquired in the other data communication systems from the other data communication systems by the information acquisition device. Then, the selected data communication system computes position information of the contactless identification tag based on the second identification information and the first identification information acquired from other data communication systems by the position information computation device.

That is, the specific data communication system, which is selected among the plurality of data communication systems, acquires the second identification information inherent to the other data communication systems and the first identification information acquired in the other data communication systems from the other data communication systems by the information acquisition device. Then, the selected data communication system computes position information of the contactless identification tag based on the second identification information and the first identification information acquired from other data communication systems by the position information computation device.

Accordingly, in the data communication system to become a representative, the position information of the contactless identification tag within the system can be comprehended. Moreover, as for a third embodiment of the present invention, in addition to the first and second embodiments, the data communication system includes a communication status information sending device to send communication status information indicating a predetermined communication status of its own data communication system and the contactless identification tag to the specific data communication system, wherein the position information computation device computes position information of the contactless identification tag also based on the communication status information sent by the communication status information sending device.

That is, the data communication system can send the communication status information indicating a predetermined communication status of its own data communication system and the contactless identification tag to the specific data communication system by the communication status information sending device, and can compute position information of the contactless identification tag also based on the communication status information sent by the communication status information sending device by the position information computation device.

Accordingly, because it is possible to compute position information based on the information indicating the communication status of the data communication system and the contactless identification tag, more correct position information of the contactless identification tag can be computed. Moreover, as for a fourth embodiment, in addition to the third embodiment, the communication status information is the radio field intensity of the electromagnetic wave received from the contactless identification tag.

That is, the communication status information is the radio field intensity of the electromagnetic wave received from the contactless identification tag, and accordingly, the distance from the data communication system can be detected by the strength of the received electromagnetic wave from the contactless identification tag, and thereby more correct position information can be computed. Moreover, as for a fifth embodiment of the present invention, in addition to the fourth embodiment, the data communication system includes a direction estimation device to estimate the direction where the contactless identification tag exists based on the radio field intensity of the electromagnetic wave received from the contactless identification tag, and the status information sending device sends the direction information estimated by the direction estimation device as the communication status information to the specific data communication system.

That is, the data communication system can estimate the direction where the contactless identification tag exists based on the radio field intensity of the electromagnetic wave received from the contactless identification tag by the direction estimation device, and can send the direction information estimated by the direction estimation device to the specific data communication system as the communication status information by the status information sending device.

Accordingly, because it is possible to estimate the direction information where the contactless identification tag exists from the data communication system, more correct position information can be computed. Moreover, as for a sixth embodiment, in addition to any of the first through fifth embodiments, the data communication system includes an information retention device to retain time information and the first identification information of the contactless identification tag, which exists within the communication range of its own data communication system.

That is, the data communication system can retain the time information and the first identification information of the contactless identification tag, which exist within the communication range of its own data communication system, by the information retention device. Accordingly, the record of the position information of the contactless identification tag can be detected, for example, from the information retained in each data communication system.

Moreover, as for a seventh embodiment of the present invention, in addition to the sixth embodiment, the data communication system includes: a first retained-contents acquisition device to acquire the retained contents of the information retention device from other data communication systems; a first retained-contents sending device to send the retained contents to the other data communication systems in response to an acquisition request of the retained contents from other data communication systems; and a record computation device to compute a move record of the contactless identification tag based on the retained contents acquired from the other data communication systems by the first retained-contents acquisition device, when its own data communication system is selected as the specific data communication system.

That is, the data communication system: can acquire the retained contents of the information retention device from other data communication systems by the first retained-contents acquisition device; can send the retained contents to other data communication systems by the first retained-contents sending device in response to the acquisition request of the retained contents from other data communication systems; and can compute a move record of the contactless identification tag based on the retained contents acquired from the other data communication systems by the first retained-contents acquisition device by the record computation device, when its own data communication system is selected as the specific data communication system.

Accordingly, in the data communication system to become the representative, because it is possible to acquire the retained contents of the information retention device from other data communication systems, and to compute record of the contactless identification tag, record of a movable body can be easily detected by sticking the contactless identification tag to the movable body or the like, or by making the movable body or the like carry the contactless identification tag. Moreover, an eighth embodiment of the present invention is a position information management system to manage position information of a predetermined article by associating the predetermined article to the contactless identification tag on a one-to-one basis in the contactless data communication system according to any of the first through sixth embodiments, wherein the position information management system is equipped with a management system for managing position information of the predetermined article, which is able to conduct data communication to the plurality of data communication systems. The management system includes a data communication system selection device to select a specific data communication system among the plurality of data communication systems, and an acquisition request sending device to send the acquisition request of the position information of the predetermined article to the specific data communication system selected by the data communication system selection device. The specific data communication system is constituted so as to compute position information of the contactless identification tag based on the second identification information acquired from other data communication systems and the first identification information of the contactless identification tag, associated to the predetermined article of the acquisition request, in response to the acquisition request sent from the management system, by the position information computation device, and includes a position information sending device to send the position information computed by the position information computation device to the management system.

With such a configuration, in the eighth embodiment of the present invention, the management system can select a specific data communication system among the plurality of data communication systems by the data communication system selection device, and can send the acquisition request of the position information of the predetermined article to the specific data communication system selected by the data communication system selection device by the acquisition request sending device. The specific data communication system can compute position information of the contactless identification tag based on the second identification information acquired from other data communication systems and the first identification information of the contactless identification tag, associated with the predetermined article of the acquisition request, by the position information computation device, and can send the position information computed by the position information computation device to the management system by the position information sending device.

Accordingly, position information of a predetermined article within the system can be easily managed by the management system. For example, it is possible to comprehend easily which type of book is put on which position by associating the contactless identification tag to a book of a library or a bookstore for managing. Moreover, position information of the contactless identification tag is computed from the position information between a plurality of data communication systems. Therefore, for example, even when changing a layout in a bookstore or the like, position information of the data communication system is not required. Therefore, the data communication system can be put on an arbitrary position, and thus the layout change becomes easy.

Moreover, as for a ninth embodiment of the present invention, in addition to the eighth embodiment, the management system includes a second retained-contents acquisition device to acquire the retained contents of the information retention device from the data communication system, and a second move record computation device to compute the move record of the contactless identification tag based on the retained contents acquired from the data communication system. The data communication system includes a second retained-contents sending device to send the retained contents to the management system in response to the acquisition request of the retained contents.

That is, the management system can acquire the retained contents of the information retention device from the data communication system by the second retained-contents acquisition device, and can compute the move record of the contactless identification tag based on the retained contents acquired from the data communication system by the second move record computation device. Furthermore, the data communication system can send the retained contents to the management system in response to the acquisition request of the retained contents by the second retained-contents sending device.

Accordingly, the move record of a predetermined article within the system can be easily detected by the management system. Moreover, a tenth embodiment of the present invention includes a contactless identification tag, applicable to the first embodiment, having a first identification information, which is the identification information inherent to its own contactless identification tag, and includes a drive power generation device to generate drive power from an eletromagnetic as a power supply sent from the data communication system and an acquisition request receiving device to receive an acquisition request of the first identification information from the data communication system. An identification information sending device sends the first identification information to the data communication system in response to the acquisition request of the first identification information received by the acquisition request receiving device.

The present invention is for the contactless identification tag in the first embodiment, and thus the description of the effect thereof will be omitted so that not to be duplicated. Moreover, a eleventh embodiment of the present invention includes a data communication system, applicable to the first embodiment, having second identification information that is the identification information inherent to its own data communication system, and includes an electromagnetic wave sending device as a power supply to send an eletromagnetic for power supply to the contactless identification tag, an identification information acquisition device to acquire the first identification information from the contactless identification tag, which exists within an area where the communication can be made, an information sending device to send the second identification information inherent to its own data communication system and the first identification information acquired by the identification information acquisition device to other data communication systems, an information acquisition device to acquire the second identification information inherent to the other data communication systems and the first identification information acquired in the other data communication systems from the other data communication systems, and a position information computation device to compute position information of the contactless identification tag based on the second identification information and the first identification information acquired from other data communication systems.

The present invention is for the data communication system in the first embodiment, and thus the description of the effect thereof will be omitted so that not to be duplicated. Moreover, a twelfth embodiment is for a management system applicable to the eighth embodiment, and includes a data communication system selection device to select a specific data communication system among a plurality of data communication systems and an acquisition request sending device to send an acquisition request of the position information of the predetermined article to the specific data communication system selected by the data communication system selection device.

The present invention is for a management system in the eighth embodiment, and thus the description of the operation effect thereof will be omitted so that not to be duplicated. Moreover, a thirteenth embodiment is for a data communication system applicable to the eighth embodiment, wherein when selected as the specific data communication system by the data communication system selection device, the data communication system computes position information of the contactless identification tag based on the second identification information acquired from other data communication systems and the first identification information of the contactless identification tag, associated to the predetermined article of the acquisition request, in response to the acquisition request sent from the management system, by the position information computation device. Furthermore, the data communication system includes a position information sending device to send the position information computed by the position information computation device to the management system.

The present invention is for a data communication system in the eighth embodiment, and thus the description of the operation effect thereof will be omitted so that not to be duplicated. Moreover, a fourteenth embodiment is for a program for controlling the tenth embodiment, and includes an acquisition request receiving step to receive the acquisition request of the first identification information from the data communication system, and an identification information sending step to send the first identification information to the data communication system in response to the acquisition request of the first identification information from the data communication system, received at the acquisition request receiving step.

The present invention is for a program for controlling the contactless identification tag in the first embodiment, and thus the description of the effect thereof will be omitted so that not to be duplicated. Moreover, a fifteenth embodiment is for a program for controlling the eleventh embodiment, and includes a sending step of an eletromagnetic for a power supply, which sends eletromagnetic for supplying power to the contactless identification tag, an identification information acquisition step to acquire the first identification information from the contactless identification tag, which exists within an area where the communication can be made, and an information sending step to send the second identification information inherent to its own data communication system and the first identification information acquired at the identification information acquisition step to other data communication systems. The program for controlling the eleventh embodiment further includes an information acquisition step to acquire the second identification information inherent to the other data communication systems and the first identification information acquired in the other data communication systems from the other data communication systems, and a position information computation step to compute the position information of the contactless identification tag based on the second identification information and the first identification information acquired from other data communication systems.

The invention is for a program for controlling the contactless identification tag in the first embodiment, and thus the description of the effect thereof will be omitted so that not to be duplicated. Moreover, a sixteenth embodiment is for a program for controlling the twelfth embodiment, and includes a data communication system selection step to select a specific data communication system among a plurality of data communication systems, and an acquisition request sending step to send an acquisition request of the position information of the predetermined article to the specific data communication system selected at the data communication system selection step.

The present invention is for a program for controlling the managing system in the eighth embodiment, and thus the description of the effect thereof will be omitted so that not to be duplicated. Moreover, a seventeenth embodiment is for a program for controlling the thirteenth embodiment, wherein when selected as the specific data communication system at the data communication system selection step, the program for controlling the data communication system computes position information of the contactless identification tag based on the second identification information acquired from other data communication systems and the first identification information of the contactless identification tag, associated to the predetermined article of the acquisition request, in response to the acquisition request sent from the management system, at the position information computation step. The program for controlling the managing system includes a position information sending step to send the position information computed at the position information computation step to the management system.

The present invention is for a program for controlling the data communication system in the eighth embodiment, and thus the description of the operation effect thereof will be omitted so that not to be duplicated. The present invention may further employ the following embodiments.

The data communication system according to the eleventh embodiment, wherein when selected as the specific data communication system, the second identification information inherent to the other data communication systems and the first identification information acquired in the other data communication systems are acquired by the information acquisition device from the other data communication systems, and the position information of the contactless identification tag is computed by the position information computation device based on the second identification information and the first identification information acquired from the other data communication systems.

The data communication system according to one of the eleventh embodiments or includes a communication status information sending device to send communication status information, indicating a predetermined communication status of its own data communication system and the contactless identification tag, to the specific data communication system, and the position information computation device to compute position information of the contactless identification tag also based on the communication status information sent by the communication status information sending device.

In the data communication system according to the communication status information is the radio field intensity of the electromagnetic wave received from the contactless identification tag. The data communication system according to includes a direction estimation device to estimate the direction where the contactless identification tag exists based on the radio field intensity of the electromagnetic wave received from the contactless identification tag, wherein the status information sending device sends the direction information estimated by the direction estimation device as the communication status information to the specific data communication system.

The data communication system according to includes an information retention device to retain time information and the first identification information of the contactless identification tag, which exists within the communication range of its own data communication system.

The data communication system according to includes a first retained-contents acquisition device to acquire the retained contents of the information retention device from other data communication systems, a first retained-contents sending device to send the retained contents to the other data communication systems in response to the acquisition request of the retained contents from other data communication systems and a first move record computation device to compute the move record of the contactless identification tag based on the retained contents acquired from the other data communication systems by the first retained-contents acquisition device, when its own data communication system is selected as the specific data communication system.

The management system according to includes a second retained-contents acquisition device to acquire the retained contents of the information retention device from the data communication system, and a second move record computation device to compute the move record of the contactless identification tag based on the retained contents acquired from the data communication system.

The data communication system according to includes a second retained-contents sending device to send the retained contents to the management system in response to the acquisition request of the retained contents.

In the data communication system control program according to the above when the data communication system is selected as the specific data communication system, the second identification information inherent to the other data communication systems and the first identification information acquired in the other data communication systems are acquired from the other data communication systems at the information acquisition step, and the position information of the contactless identification tag is computed based on the second identification information and the first identification information acquired from other data communication systems at the position information computation step.

The data communication system control program according to the above includes a communication status information sending step to send the communication status information to the specific data communication system, wherein at the position information computation step, the position information of the contactless identification tag is computed also based on the communication status information sent at the communication status information sending step.

In the data communication system control program the communication status information is the radio field intensity of the electromagnetic wave received from the contactless identification tag.

The data communication system control program includes a direction estimation step to estimate the direction where the contactless identification tag exists based on the radio field intensity of the electromagnetic wave received from the contactless identification tag. The direction information estimated at the direction estimation step is sent to the specific data communication system as the communication status information at the status information sending step.

The data communication system control program includes an information retention step to retain time information and the first identification information of the contactless identification tag, which exists within the communication range.

The data communication system control program includes a first retained-contents acquisition step to acquire retained contents of the information retention step from other data communication systems, a first retained-contents sending step to send the retained contents to other data communication systems in response to the acquisition request of the retained contents from the other data communication systems and a first move record computation step to compute the move record of the contactless identification tag based on the retained contents acquired from the other data communication systems at the first retained-contents acquisition step, when its own data communication system is selected as the specific data communication system.

The management system control program includes a second retained-contents acquisition step to acquire retained contents of the information retention step from the data communication system, and a second move record computation step to compute the move record of the contactless identification tag based on the retained contents acquired from the data communication system.

The data communication system control program also includes a second retained-contents sending step to send the retained contents to the management system in response to the acquisition request of the retained contents.

BRIEF DESCRIPTION OF THE DRAWINGS

FIG. 2 shows a detailed configuration of a bookshelf 100.

FIGS. 3(A) and 3(B) show an example of an attachment position of a contactless identification tag 4 to a book 20.

DESCRIPTION OF THE PREFERRED EMBODIMENTS

Figure 1:
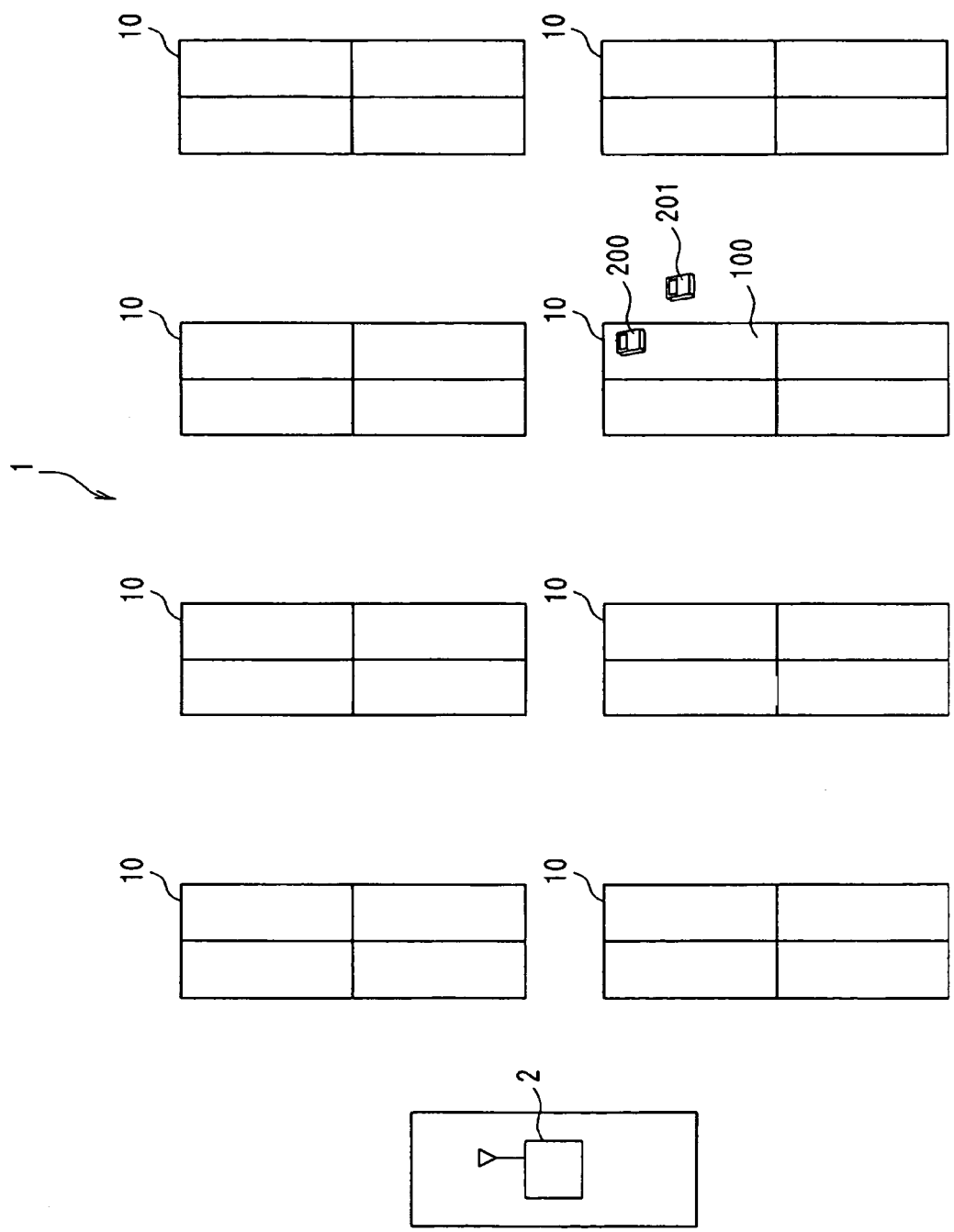
FIG. 1 shows a block diagram illustrating a configuration of a position information management system according to the present invention.

Hereinafter, embodiments of the present invention will be described with reference to drawings. FIG. 1 through FIG. 15 shows embodiments, in which a position information management system according to the present invention is employed in a library. At first, a configuration of a position information management system according to the present invention will be described with reference to FIG. 1. FIG. 1 shows a block diagram illustrating a configuration of the position information management system according to an embodiment of the present invention.

As shown in FIG. 1, the position information management system 1 includes a management system 2 and a plurality of bookshelves 10 provided with a data communication system 3 to be described later. The management system 2 is for managing position information or the like of books stored in the bookshelfs, and managing information such as a type of book, a title of a book, stored position of a book, and lending or not of the book. The bookshelf 10 is a shelf where books to lend out at the library are stored. A management number is attached to each bookshelf 10, and in the embodiment, the stored position of each book is managed by being associated to this number.

Furthermore, a detailed configuration of a bookshelf 100 among a plurality of bookshelves 10 shown in FIG. 1 will be described with reference to FIG. 2. FIG. 2 shows a detailed configuration of the bookshelf 100. As shown in FIG. 2, the bookshelf 100 includes storing blocks 100$a$ through 100$f$ and data communication systems 3A through 3F, each of which is arranged in each of the storing blocks 100$a$ through 100$f$. Furthermore, a book 200 is placed on top of the bookshelf 100, and a book 201 is put on the floor in front of the bookshelf 100.

A plurality of books 20 (six copies) and the data communication systems 3A through 3F (one system for each storing block) are stored in the storing blocks 100$a$ through 100$f$, respectively, and a contactless identification tag 4, to be described later, is attached to each of the books 20. In the present embodiment, various information about the books, such as positions and titles of the books 20 corresponding to the contactless identification tag 4, are managed by carrying out a communication with the contactless identification tag 4, attached to the books 20, by the data communication system 3.

Furthermore, an attachment position of the contactless identification tag 4 to the book 20 will be described with reference to FIGS. 3(A) and 3(B). FIGS. 3(A) and 3(B) show an example of an attachment position of the contactless identification tag 4 to the books 20. As for an attachment position of the contactless identification tag 4 to the books 20, a back cover of the book shown in FIG. 3(A) and an inside cover of the book 20 shown in FIG. 3(B) or the like can be considered. The attachment positions are not limited to these positions, but other attachment positions may be used. Moreover, as shown in FIGS. 3(A) and 3(B), the attachment position is not limited to the upper left corner of each top cover, but may be arbitrary positions such as the upper right corner and the lower left corner.

Figure 4:
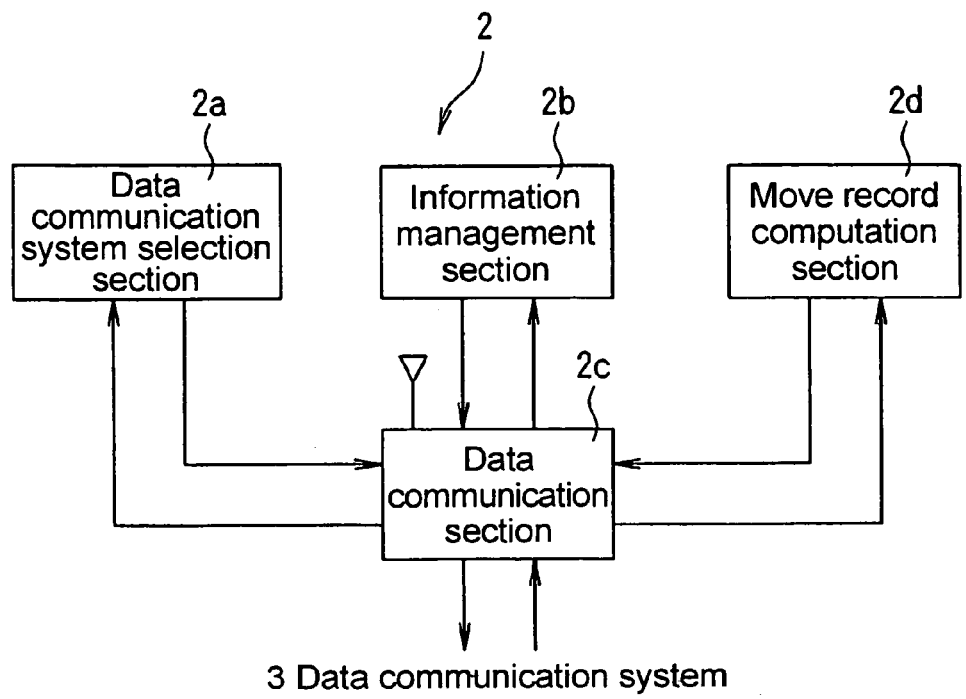
FIG. 4 shows a block diagram of a detailed configuration of a management system 2.

Furthermore, a detailed configuration of the management system 2 will be described with reference to FIG. 4. FIG. 4 shows a block diagram illustrating a detailed configuration of the management system 2. As shown in FIG. 4, the management system 2 includes a data communication system selection section 2a, an information management section 2b, a data communication section 2c, and a move record computation section 2d.

The data communication system selection section 2a is for selecting a representing system among a plurality of data communication systems 3, and the selected data communication system 3 collects the information on the contactless identification tag 4 acquired by other data communication systems 3, and carries out the computation process such as the computation of the position information or the like. The information management section 2b is for acquiring various information including position information regarding the books 20 from the data communication system 3 selected by the above-described data communication system selection section 2a, and for managing the books 20 based on a stored data base that is used for the book management information and provided to the information management section 2b. The book management information includes type of books, titles of books, a stored position of books, a lending status of books or the like.

The data communication section 2c has a function to carry out data communication by radio to the data communication systems 3. The move record computation section 2d acquires position information on the designated book 20 retained in the data communication system 3, and computes the move record of the designated book 20. The designated book 20 refers to the book 20 designated as the object whose information is to be acquired.

Figure 5:
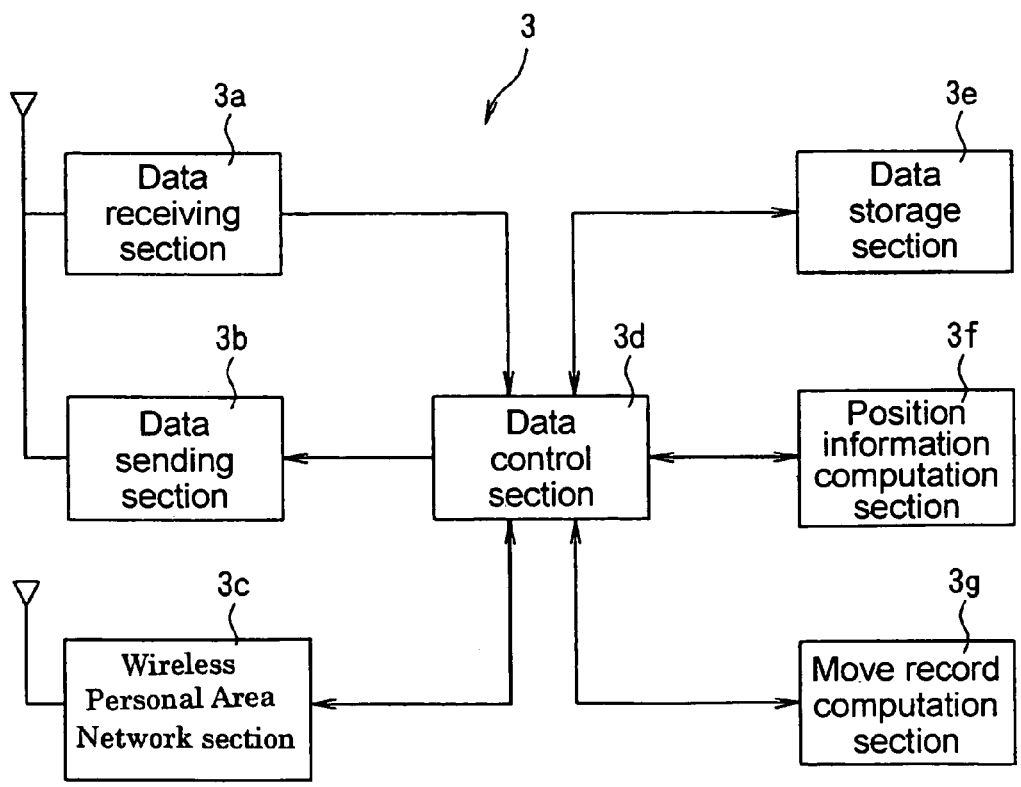
FIG. 5 shows a block diagram of a detailed configuration of a data communication system 3.

Furthermore, a detailed configuration of the data communication system 3 will be described with reference to FIG. 5. FIG. 5 shows a block diagram illustrating a detailed configuration of the data communication system 3. As shown in FIG. 5, the data communication system 3 includes a data receiving section 3a, a data sending section 3b, a wireless Personal Area Network section 3c, a data control section 3d, a data storage section 3e, a position information computation section 3f, and a move record computation section 3g.

The data receiving section 3a has a function to receive data from the contactless identification tag 4 by an electromagnetic induction method. The data sending section 3b has a function to send data to the contactless identification tag 4 by the electromagnetic induction method. In the present embodiment, a carrier wave at the time of communication is also the electromagnetic wave for supplying power to the contactless identification tag 4.

The wireless Personal Area Network section 3c includes a function to carry out, by radio, sending and receiving of data to/from the management system 2 and sending and receiving of data to/from other data communication systems 3. The data control section 3d controls operations of the data communication systems 3 by carrying out a control program stored in ROM (not shown) by a CPU (not shown). The contents of the control include, first of all, control of the data communication processes, such as receiving of the data from the contactless identification tag 4 and sending of the data to the contactless identification tag 4, by the electromagnetic induction method using the data receiving section 3a and the data sending section 3b. The data control section 3d integrally controls each functional section including the data communication system 3, such as the control of communication process with the management system 2 and the communication process with other data communication systems 3 by using the wireless Personal Area Network section 3c.

The data storage section 3e is for storing and retaining position information and time information of the contactless identification tag 4. The position information computation section 3f has a function to detect a radio field intensity at the time of communication through the data communication with the contactless identification tag 4 attached to the designated book 20, and to estimate the direction of the existence of the designated book 20, based on the radio field intensity, against the data communication system 3 from the distance information to the designated book 20 and the direction where the strongest electromagnetic wave is being received. Accordingly, in order to estimate the direction, it has a plurality of antennas for receiving electromagnetic waves from various directions.

Furthermore, when the data communication system 3 is selected by the data communication system selection section 2a in the above-described management system 2, the position information computation section 3f acquires the distance information and the direction information (for example, an angle information) of the designated book 20 from other data communication systems 3, and carries out a process to compute the position information of the designated book 20. When the data communication system 3 is selected by the data communication system selection section 2a in the above-described management system 2, the move record computation section 3g acquires the record information of the designated book 20, which the other data communication systems 3 retain, from other data communication systems 3 in response to a request from the management system 2, and computes the move record of the designated book 20 based on the record information.

Figure 6:
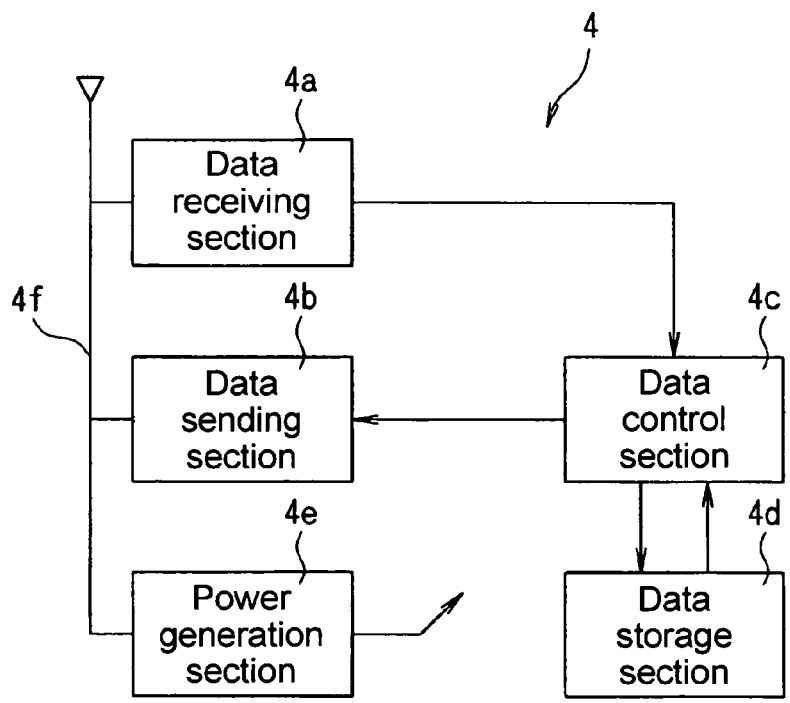
FIG. 6 shows a block diagram of a detailed configuration of a contactless identification tag 4.

Furthermore, a detailed configuration of the contactless identification tag 4 will be described with reference to FIG. 6. FIG. 6 shows a block diagram illustrating a detailed configuration of the contactless identification tag 4. As shown in FIG. 6, the contactless identification tag 4 includes a data receiving section 4a, a data sending section 4b, a data control section 4c, a data storage section 4d, and a power generation section 4e.

The data receiving section 4a has a function to receive data transmitted from the data communication system 3 by the electromagnetic induction method. The data sending section 4b has a function to send predetermined data stored in the information storage section 4d to the data communication system 3 by the electromagnetic induction method. The control section 4c controls the operation of each section of the contactless identification tag 4 by carrying out a control program by a CPU (not shown).

The information storage section 4d has a function to store predetermined data, such as data sent from the data communication system 3, to the memory which the information storage sections 4d is equipped with. The power generation section 4e receives an electromagnetic wave from the data communication system 3, generates power from the electromagnetic wave, and provides it to each of the above-described sections. A loop antenna 4f is made by forming a coil on a circuit board by an ink-jet method using metal ink, or a screen printing method using copper, aluminum or the like.

Figure 7:
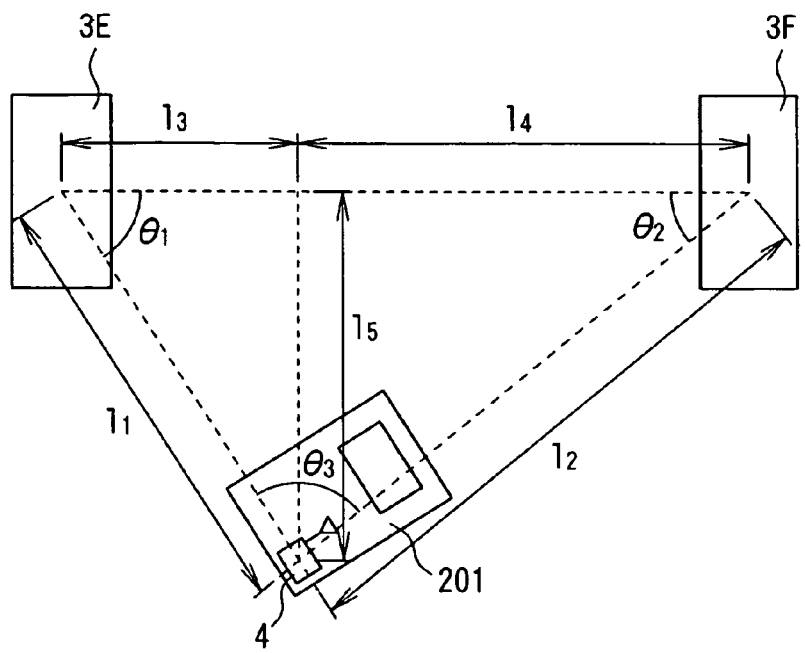
FIG. 7 shows an example of a computation of a position of a designated book.
Figure 8:
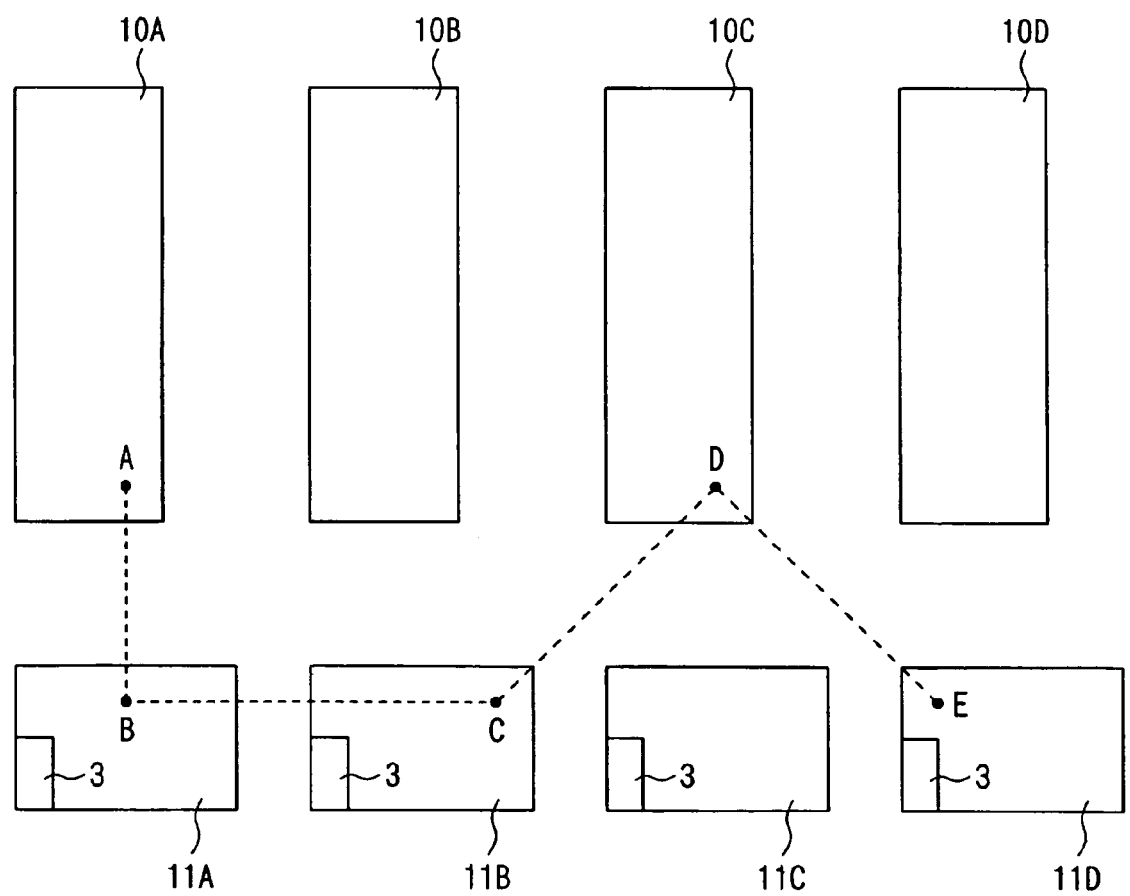
FIG. 8 shows an example of a move record of a designated book.

Furthermore, a more specific operation of the position information management system 1 used with a library will be described with reference to FIGS. 2, 7 and 8. FIG. 7 shows an example of computing the position of the designated book, and FIG. 8 shows an example of moving the record of the designated book. For convenience of the description, the operation of the system will be described by focusing on the bookshelf 100 shown in FIG. 2.

In a library, an operator of the management system 2, for example, receives a request to search for a certain book from a visitor. The operator receives the information of the book (hereinafter, referred to as the designated book), such as the book's title, which the visitor is looking for, from the visitor. Then, using this information as a keyword, the data base, of the information management section 2b of the management system 2, is searched, and information of whether the designated book exists or not within the library, or information of whether the designated book is on loan or not, is detected. If the designated book exists within the library and is on loan, that information is reported to the visitor. On the other hand, if the designated book exists within the library and is not on loan, the position information of the designated book, set in advance in the data base, is displayed on a display (not shown). Accordingly, the operator can convey the displayed position information to the visitor or guide the visitor to the position based on this position information.

However, in case that the designated book has not been found in the position where the designated book should exist, the operator carries out a process to search where the designated book exists within the library by the management system 2. At first, the operator selects the data communication system 3, which becomes a representative (for example, select the data communication system 3A shown in FIG. 2), by the data communication system selection section 2a. As for the data communication system 3, which becomes a representative, a newly-selected one may be used for each time, or a previously-selected one may be used.

Then, upon selection of a process to search for the designated book in the information management section 2b, the information management section 2b acquires the identification information of the contactless identification tag 4 attached to the designated book from the data base, generates a search request of the designated book that includes the identification information, and sends this information to the data communication system 3A selected as the representative through the data communication section 2c.

Upon receipt of the search request from the management system 2 through the wireless Personal Area Network section 3c in the data control section 3d, the data communication system 3A adds its own identification information to this search request, and sends the search request, to which the identification information has been added, through the wireless Personal Area Network section 3c, to other data communication systems 3B through 3F within the library.

The data communication systems 3B through 3F, which received the search request from the data communication system 3, selected as the representative, through the wireless Personal Area Network section 3c, generate a response request including the identification information based on the identification information of the contactless identification tag 4 attached to the object book, which is included in the search request, in the data control section 3d, and sends this response request to the contactless identification tag 4 attached to the book, which exists within its own communication range, through the data sending section 3b.

Upon receipt of the electromagnetic wave including the response request sent from the data communication system 3 through the loop antenna 4f, the contactless identification tag 4 generates a drive power by the power generation section 4e at first, and carries out a process to provide this power to each section. After tower is provided and each section is activated, the response request from the data communication system 3 is acquired by the data control section 4c by demodulating the received electromagnetic wave through the data receiving section 4a. Then, the identification information contained in this response request is extracted and compared with its own identification information. When both of the identification information are in agreement, a response is returned to the data communication system 3 of the sending source of the response request through the data sending section 4b and the loop antenna 4f. Moreover, in the present embodiment, if both of the identification information are not in agreement, a response is not returned.

Upon receipt of the response from the contactless identification tag 4 attached to the designated book through the data receiving section 3a, the data communication system 3 stores the time of the receipt and the identification information contained in the response by the data storage section 3e. Then, in the position information computation section 3f, the radio field intensity is measured from the electromagnetic wave received from the contactless identification tag 4, and the direction where the contactless identification tag 4 exists is estimated based on the position of the antenna whose received radio field intensity is the highest. Furthermore, the distance from the data communication system 3 to the contactless identification tag 4 is estimated from the radio field intensity. This information of the estimated direction and distance, being added by its own identification information, is sent to the data communication system 3A, selected as the representative, through the wireless Personal Area Network section 3c. Moreover, this information of the estimated direction and distance is stored, being associated with the identification information, which has been stored earlier by the data storage section 3e. That is, in each data communication system 3, this information is stored and managed as the record information of the book. Moreover, the computation process of the above-described direction information and the distance information, and the storage process of the computed result are also carried out in the data communication system 3A, selected as the representative.

Then, upon receipt of the above-described direction information and the distance information through the wireless Personal Area Network section 3c, from either of the data communication systems 3B through 3F within whose communication range the designated book exists, the data communication system 3A computes the position of the designated book by the position information computing section 3f based on the received information of the direction and the distance. That is, because the distance and the direction from the data communication system 3 are detected from the information from the data communication system 3 where the existence of the designated book was detected, the position of the designated book can be computed based on this information. A more accurate position of the designated book can be computed by integrating and evaluating the information from a plurality of data communication systems 3. Accordingly, it is possible to compute the position of the designated book, which is not stored in the correct stored position, such as a book stored in a different storing block from the original block, the book 200 placed on top of the bookshelf 100, and the book 201 placed on the floor in front of the bookshelf 100 shown in FIG. 2.

Then, the computed position information is sent to the management system 2 by the data control section 3*d* through data sending section 3*b*. The management system 2 that received this information analyzes the acquired position information, determines the position of the designated book and displays the information on a display (not shown). As for the present embodiment, the information of the arranged position in the bookshelf 100 of the data communication systems 3 is given to the management system 2, and for example, by graphically displaying inside the library by computer graphics and graphically displaying the approximate position of the designated book on the display. The position of the designated book that has been searched by the operator can be visually displayed to be easily understood.

Furthermore, an example of computing the position of the designated book, where the designated book is assumed to be the book 201 shown in FIG. 2, will be described with reference to FIG. 7. At first, the data communication system 3A selected as the representative, acquires the estimated direction information ($\theta$) and the distance information (I) (($\theta_1$, $I_1$), ($\theta_2$, $I_2$)) of the contactless identification tag 4 that is attached to the designated book 201 from two sets of the data communication systems 3E and 3F, respectively. Next, the position information computation section 3*f* computes values such as $\theta_3$, $I_3$ through $I_5$ shown in FIG. 7 using a trigonometric function or the like based on the estimated direction information ($\theta$) and the distance information (I) that was acquired. Accordingly, based on this computation result, the position of the designated book 201 can be expressed as a position, having a distance of $I_3$ from the data communication system 3E towards the data communication system 3F, $I_4$ from the data communication system 3F towards the data communication system 3E, and $I_5$ from the point, where $I_3$ and $I_4$ meet, towards the front of the bookshelf 100.

Furthermore, if the existence of the designated book has not been detected anywhere within the library, the operator is able to detect the move record of the designated book by the management system 2. In this case, as a first method according to the present embodiment, there is provided a method to let the data communication system 3 compute the move record by sending an acquisition request of the move record of the designated book to the data communication system 3A that is selected as the representative, and to acquire the computed move record from the data communication system 3 that is selected as the representative. Moreover, as a second method, there is provided a method where the management system 2 acquires the record information from the data communication system 3 by sending an acquisition request of the above-described record information of the designated book, which is stored in the data storage section 3*e*, to the data communication systems 3 arranged within the library, and thus the move record of the designated book is computed by the move record computation section 2*d* based on the above-described acquired record information.

In either method, (the move record computation section 2*d* or the move record computation section 3*g*) what kind of the move record the designated book has is computed based on the time the designated book is detected and its position information (the direction and the distance), which are acquired from the data communication system 3. As shown in FIG. 8, suppose bookshelves 10A through 10D and reading desks 11A through 11D are provided within the library. Furthermore, according to the present embodiment, it is possible to compute the position of the book that has been taken out for reading by also arranging each data communication system 3 to these reading desks 11A through 11D.

For example, suppose the existence of the designated book at the position of A in the drawing was detected at 10:00 AM, the existence at the position of B was detected at 10:20 AM, the existence at the position of C was detected at 1:00 PM, the existence at the position of D was detected at 3:00 PM, and the existence at the position of E was detected at 5:00 PM from the record information of the designated book acquired from the data communication system 3 What is actually detected is the existence of the contactless identification tag 4 having the identification information associated with the designated book, and the information about its position.

Figure 9:
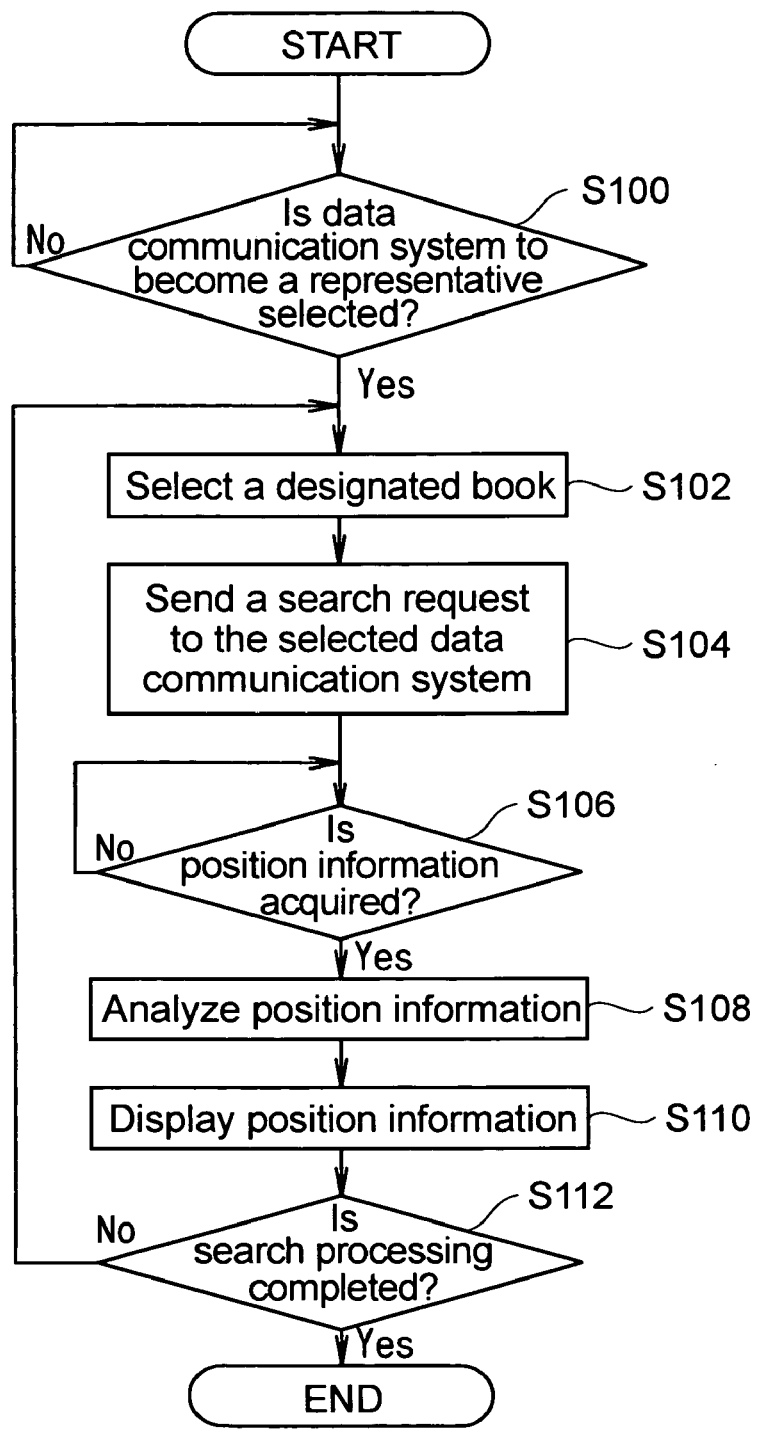
FIG. 9 shows a flow chart illustrating a search processing of a designated book in the management system 2.

That is, from the above-described acquired record information, it is understood that the designated book existed at the position of A in the bookshelf 10A, at first, and then moved to the position of B of the reading-desk 11A, to the position of C of the reading-desk 11B, to the position of D in the bookshelf 10C, to the position of E of the reading-desk 11D. Furthermore, a flow search process of the designated book in the management system 2 will be described with reference to FIG. 9. FIG. 9 shows a flow chart illustrating a search process of the designated book in the management system 2.

As shown in FIG. 9, at Step S100 in the data communication system selection section 2*a*, the process judges whether the data communication system 3, to become a representative, has been selected or not, and if judged as having been selected (YES), the process proceeds to Step S102, and if not (No), the process waits until the data communication system 3 has been selected. According to the present embodiment, the selection of the data communication system 3 to become the representative does not need to be carried out each time, and this process can be omitted by keeping the setting of the data communication system 3 that was previously selected.

Proceeding to Step S102, the designated book is selected by the information management section 2*b*, and then the process proceeds to Step S104. According to the present embodiment, regarding the selection of the designated book, the operator inputs information known in advance such as the book's title, the author's name or the like as keywords, searches the data base of the information management section 2*b*, and selects information from a list displayed on the display.

At Step S104, a search request of the designated book is generated by the information management section 2*b* based on the identification information of the contactless identification tag 4 corresponding to the selected book, and this request is sent to the data communication system 3, selected as the representative, through the data communication section 2*c*, and the process proceeds to Step S106. At Step S106, the process judges whether the position information of the designated book has been acquired from the data communication system 3, selected as the representative, or not, in the information management section 2b, and if judged as having been acquired (Yes), the process proceeds to Step S108, and if not (No), the process waits until the position information has been acquired.

At Step S108, the above-described acquired position information is analyzed in the information management section 2b, and the process proceeds to Step S110. At Step S110, the information is displayed on the display in a way easy to understand for a user such as an operator based on the analyzed position information, and the process proceeds to Step S112.

Figure 10:
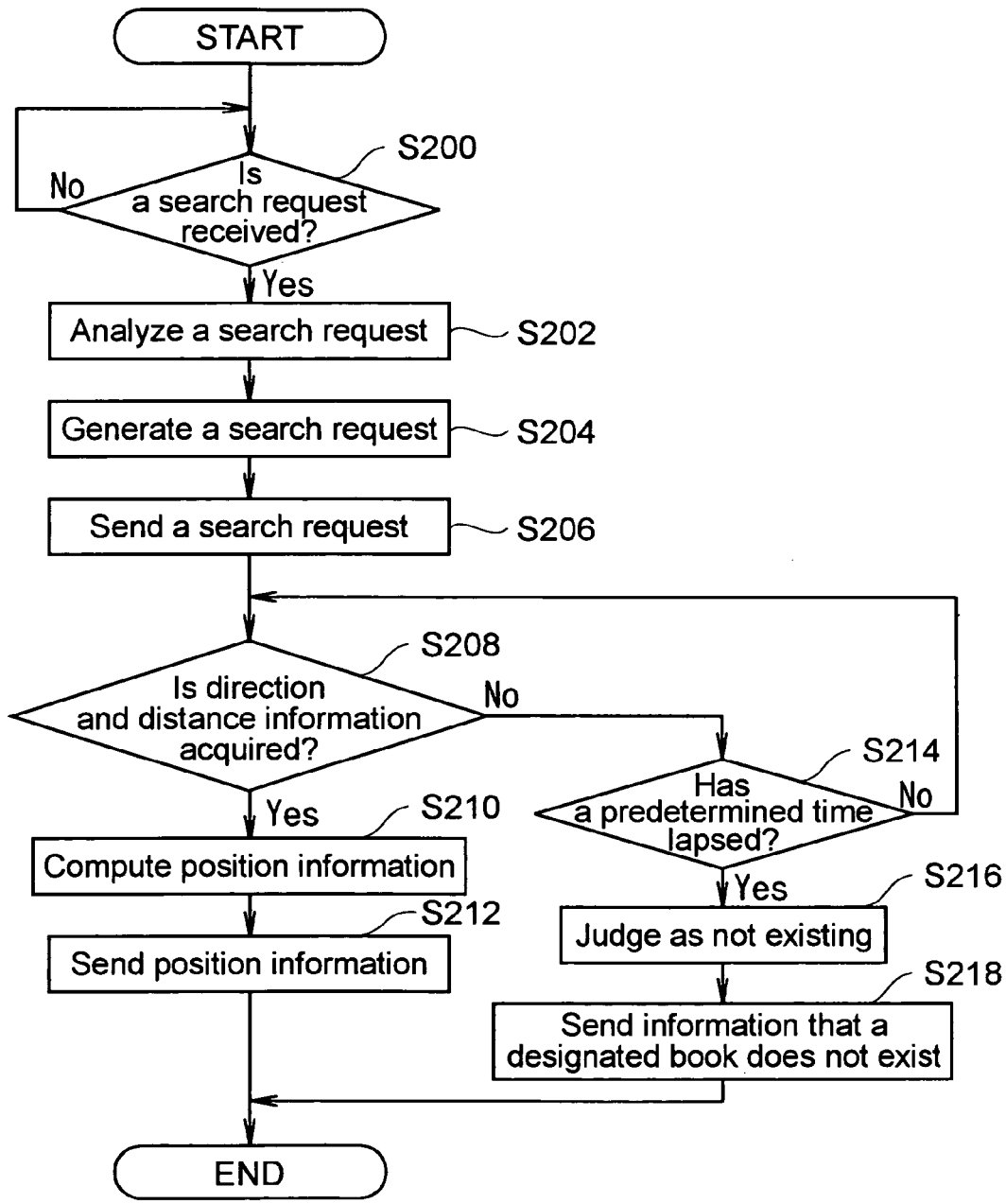
FIG. 10 shows a flow chart illustrating a computation processing of position information in the data communication system 3.

At Step S112, whether the search processing has been completed or not is judged in the information management section 2b, and if judged as being completed (Yes), then the process is terminated, and if not (No), the process proceeds to Step S102. That is, if there is another book to search for, the process proceeds to Step S102 and the process will be carried out again from the process for selecting a designated book. Furthermore, a flow of the computation process of the position information in the data communication system 3 will be described with reference to FIG. 10. FIG. 10 shows a flow chart illustrating the computation process of the position information in the data communication system 3.

As shown in FIG. 10, at Step S200, the process judges whether the search request has been received through the wireless Personal Area Network section 3c from the management system 2 or not in the data control section 3d. If judged as having been received (Yes), the process proceeds to Step S202, and if not (No), the process waits until the search request has been received. At Step S202, the received search request is analyzed in the data control section 3d, and the process proceeds to Step S204. It is understood by this analysis process that its own data communication system 3 has been selected as the representative.

At Step S204, in the data control section 3d, based on the analysis result of the received search request from the management system 2, a search request for acquiring information about the position of the designated book from other data communication systems 3 is generated, and the process proceeds to Step S206. At Step S206, in the data control section 3d, the generated search request is sent to other data communication systems 3 through the wireless Personal Area Network section 3c, and the process proceeds to Step S208.

At Step S208, the process judges whether the information on the direction and the distance, to which the designated book exists, has been acquired or not in the data control section 3d. If judged as having been acquired (Yes), the process proceeds to Step S210, and if not (No), the process proceeds to Step S214. According to the present embodiment, because the search process of the designated book is carried out also in the data communication system 3 selected as the representative, a case, which the data communication system 3 verifies the existence of the designated book and computes its direction information and its distance information, is judged as having been acquired.

At Step S210, in the position information computation section 3f, based on the direction information and the distance information where the designated book exists, which are acquired from the other data communication systems 3, the position information of the designated book is computed, and the process proceeds to Step S212. At Step S212, the position information of the computed designated book is sent to the management system 2 by the data control section 3d through the wireless Personal Area Network section 3c, and the process is terminated.

On the other hand, at Step S214, in the data control section 3d, the process judges whether a predetermined time period has passed or not, and if judged as having passed (Yes), the process proceeds to Step S216, and if not (No), proceeds to Step S208. At Step S216, the data control section 3d judges that the designated book does not exist within the library, and the process proceeds to Step S218.

Figure 11:
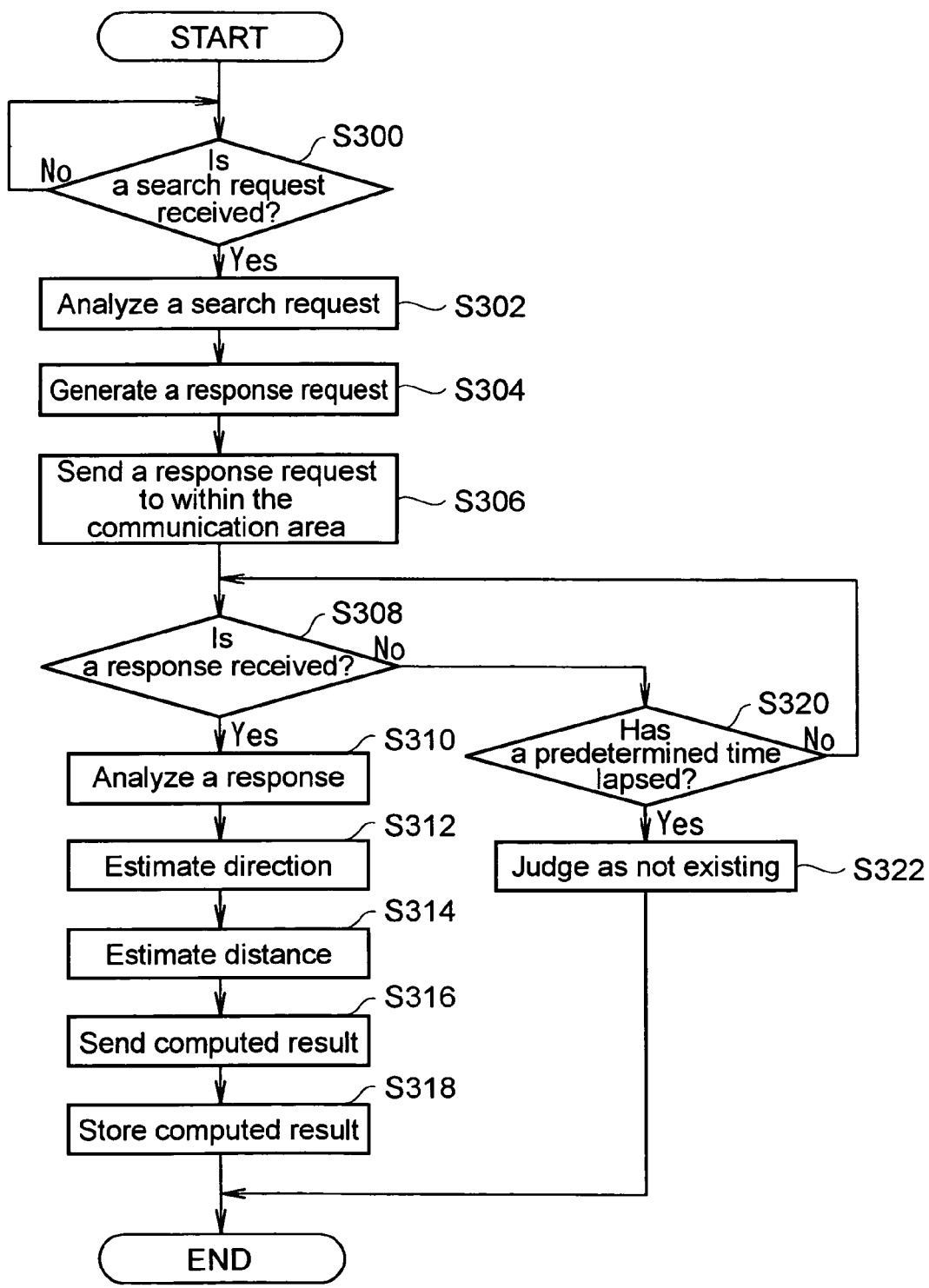
FIG. 11 shows a flow chart illustrating a computation processing of direction information and distance information on a designated book in the data communication system 3.

At Step S218, information indicating that the designated book does not exist is sent by the data control section 3d to the management system 2 through the wireless Personal Area Network section 3c, and the process is terminated. Furthermore, a flow of the computation process of the direction information and the distance information of the designated book in the data communication system 3 will be described with reference to FIG. 11. FIG. 11 shows a flow chart illustrating the computation process of the direction information and the distance information of the designated book in the data communication system 3.

As shown in FIG. 11, the process proceeds to Step S300, and judges whether the search request of the designated book has been received from the data communication system 3 that is selected as the representative through the wireless Personal Area Network section 3c or not in the data control section 3d. If judged as having been received (Yes), the process proceeds to Step S302, and if not (No), the process waits until the search request has been received.

At Step S302, the search request that is received from the data communication system 3 that is selected as the repress analyzed in the data control section 3d, and the process proceeds to Step 304. The identification information of the data communication system 3 that is selected as the representative, the identification information of the contactless identification tag 4 attached to the designated book or the like are detected by this analysis process. At Step S304, in the data control section 3d, a response request to the contactless identification 4 attached to the designated book is generated based on the analysis result of the search request, and the process proceeds to Step S306.

At Step S306, in the data control section 3d, the generated response request is sent towards the contactless identification tag 4, which exists within the communication range, through the wireless Personal Area Network section 3c, and the process proceeds to Step S308. At Step S308, the process judges whether a response to the response request has been received from the contactless identification tag 4, which exists within the communication range, through the data receiving section 3a or not, in the data control section 3d, and if judged as having been received (Yes), the process proceeds to Step S310, and if not (No), the process proceeds to Step S320.

At Step S310, the received response is analyzed in the data control section 3d, and the process proceeds to Step S312. The contents of the analysis include the received radio field intensity or the like at each of a plurality of antennas. At Step S312, in the data control section 3d, the direction, where the contactless identification tag 4 exists, is estimated based on the radio field intensity at each antenna, and the process proceeds to Step S314.

At Step S314, in the data control section 3d, the distance between its own data communication system 3 and the contactless identification tag 4 is estimated based on the radio field intensity at each antenna, and the process proceeds to Step S316. At Step S316, in the data control section 3d, the computed direction information and distance information are sent to the data communication system 3 that is selected as the representative through the wireless Personal Area Network section 3c, and the process proceeds to Step S318.

At Step S318, in the data storage section 3e, the computed direction information and distance information are stored by associating to the identification information of the contactless identification tag 4 that responded, and the process is terminated. On the other hand, at Step S320, in the data control section 3d, it is judged whether the time, during which any response has not been received, has lapsed over a predetermined period or not, and if judged as having lapsed (Yes), the process proceeds to Step S322, and if not (No), the process proceeds to Step S308.

Figure 12:
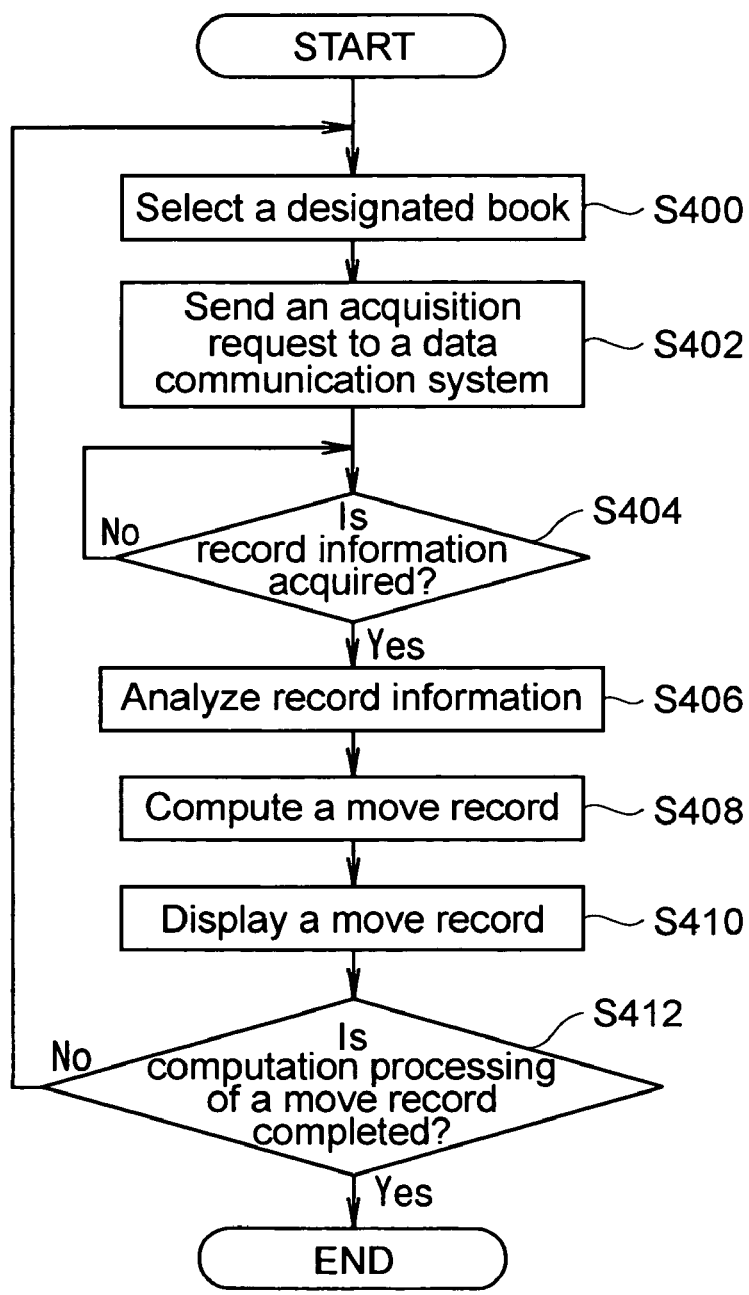
FIG. 12 shows a flow chart illustrating a computation processing of a move record in the management system 2.

At Step S322, the data control section 3d judges that the designated book does not exist within the communication range, and the process is terminated. Furthermore, a flow of the computation process of record in the management system 2 will be described with reference to FIG. 12. FIG. 12 shows a flow chart illustrating the computation process of the move record in the management system 2. This process is the computation process of the move record according to the above-described first method.

As shown in FIG. 12, at Step S400, the designated book, whose move record is desired to be detected, is selected in the information management section 2b, and the process proceeds to Step S402. As for the present embodiment, regarding the selection of the designated book, the operator inputs information known in advance of the book as a keyword, searches the data base, and selects the information from a list displayed as the search results on the display.

At Step S402, in the information management section 2b, an acquisition request for the record information is generated based on the identification information of the contactless identification tag 4 attached to the selected designated book, and this request is sent to the data communication system 3 within the library through the data communication section 2c, and the process proceeds to Step S404. At Step S404, in the information management section 2b, it is judged whether the record information has been acquired from the data communication system 3 within the library through the data communication section 2c or not, and if judged as having been acquired (Yes), the process proceeds to Step S406, and if not (No), the process waits until the record information has been acquired.

At Step S406, in the move record computation section 3g, the acquired record information is analyzed, and the process proceeds to Step S408. At Step S408, record of the designated book is computed based on the analysis result in the move record computation section 3g, and the process proceeds to Step S410. At Step S410, the compute move record is displayed on the display by the data control section 3d, and the process proceeds to Step S412.

At Step S412, in the data control section 3d, the process judges whether the computation process of the move record is completed or not, and if judged as being completed (Yes), the process is terminated, and if not (No), the process proceeds to Step S400. That is, if there is another designated book whose move record is to be computed, the process proceeds to Step S400, and the process will be carried out again from the process for selecting the designated book.

Figure 13:
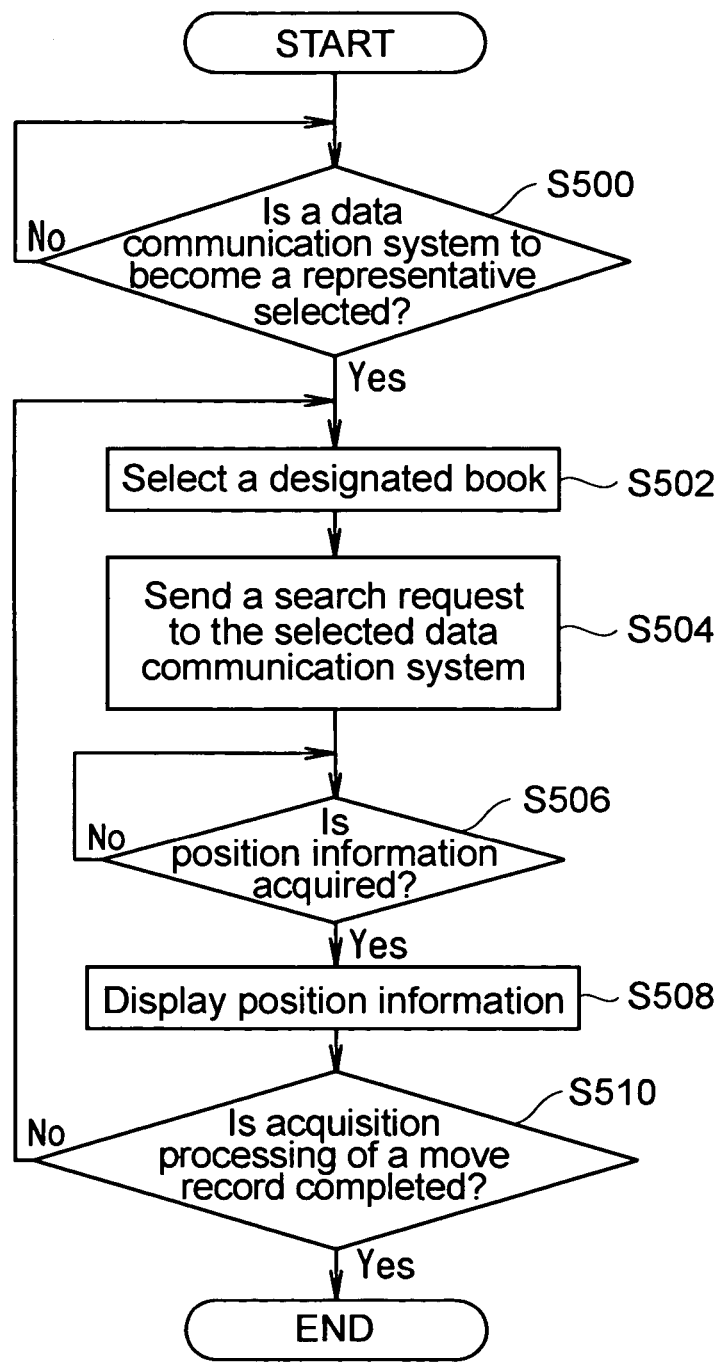
FIG. 13 shows a flow chart illustrating a computation processing of a move record in the management system 2.

Furthermore, a flow of a computation process of the move record in the management system 2 will be described with reference to FIG. 13. FIG. 13 shows a flow chart illustrating the computation process of the move record in the management system 2. This process is the computation process of the move record according to the above-described second method. As shown in FIG. 13, the process proceeds to Step S500 at first, and in the data communication system selection section 2a, the process judges whether the data communication system 3, which is to be a representative, has been selected or not, and if judged as having been selected (Yes), the process proceeds to Step S502, and if not (No), the process waits until the data communication system 3 has been selected.

At Step S502, in the information management section 2b, the designated book, whose move record is desired to be acquired, is selected, and the process proceed to Step S504. At Step S504, in the information management section 2b, an acquisition request of the move record is generated based on the identification information of the contactless identification tag 4 attached to the selected designated book, and this request is sent to the data communication system 3 that is selected as the representative through the data communication section 2c, and the process proceeds to Step S506.

At Step S506, in the information management section 2b, it is judged whether the move record has been acquired from the data communication system 3 that is selected as the representative or not, and if judged as having been acquired (Yes), the process proceeds to Step S508, and if not (No), the process waits until the move record has been acquired. At Step S508, the acquired move record is displayed on the display by the information management section 2b, and the process proceeds to Step S510.

At Step S510, in the information management section 2b, it is judged whether the acquisition process of the move record has been completed or not, and if judged as being completed (Yes), then the process is terminated, and if not (No), the process proceeds to Step S502. That is, if there is another designated book whose move record is to be computed, the process proceeds to Step S502, and the process will be carried out again from the process for selecting the designated book.

Figure 14:
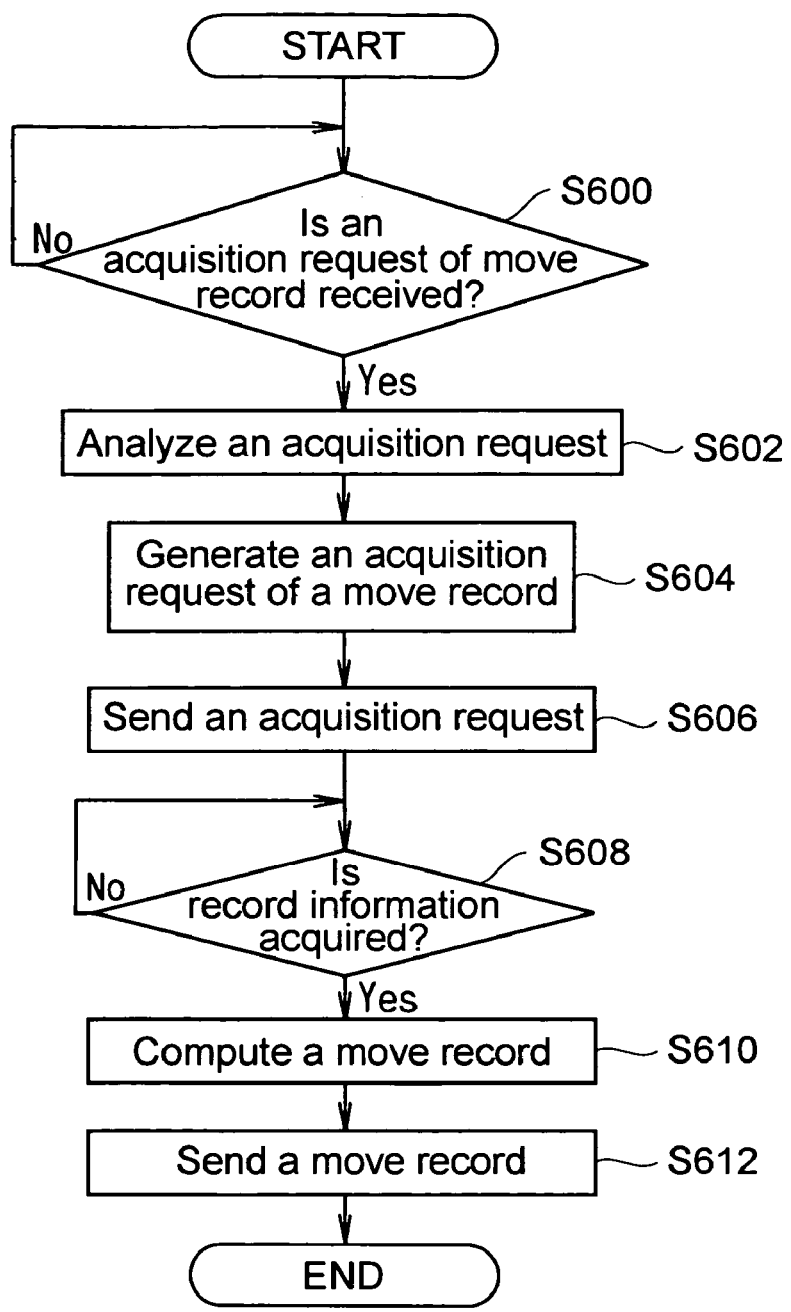
FIG. 14 shows a flow chart illustrating a computation processing of a move record in the data communication system 3.

Furthermore, a flow of the computation process of the move record in the data communication system 3 will be described with reference to FIG. 14. FIG. 14 shows a flow chart illustrating the computation process of the move record in the data communication system 3. As shown in FIG. 14, the process proceeds to Step S600 and in the data control section 3d, it is judged whether the acquisition request of the move record has been received from the management system 2 or not, and if judged as having been received (Yes), the process proceeds to Step S602, and if not (No), the process waits until the acquisition request has been received.

At Step S602, the received acquisition request is analyzed in the data control section 3d, and the process proceeds to Step S604. The identification information or the like of the contactless identification tag 4 attached to the designated book is detected by this analysis. At Step S604, an acquisition request of the record information is generated based on the analysis result in the data control section 3d, and the process proceeds to Step S606. This acquisition request includes its own identification information that is selected as the representative, the identification information of the contactless identification tag 4 attached to the designated book.

At Step S606, the generated acquisition request is sent to other data communication systems 3 through the wireless Personal Area Network section 3c by the data control section 3d, and the process proceeds to Step S608. At Step S608, in the data control section 3d, it is judged whether the record information has been acquired or not, and if judged as having been acquired (Yes), the process proceeds to Step S610, and if not (No), the process waits until the record information has been acquired. A case, which the information of the designated book is included in its own record information selected as the representative, is also judged as having been received.

Figure 15:
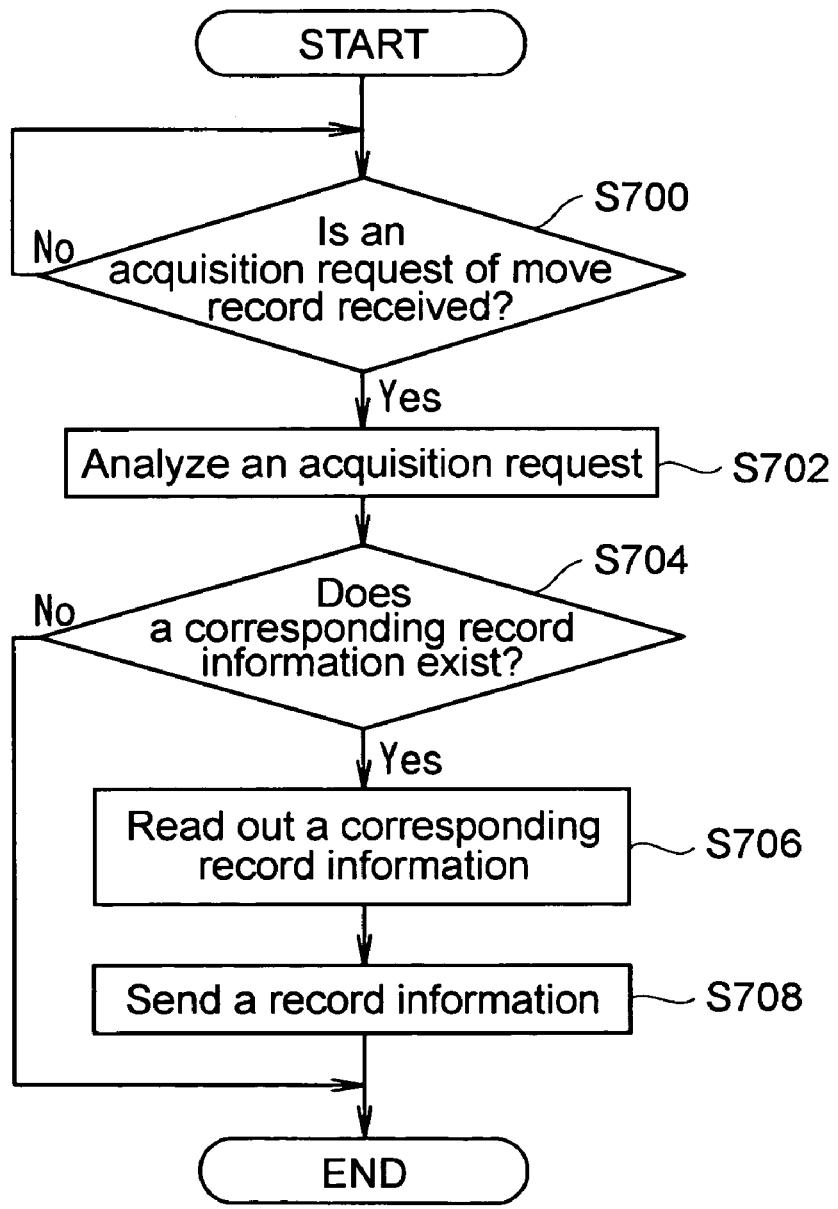
FIG. 15 shows a flow chart illustrating a sending processing of record information in the data communication system 3.

At Step S610, the move record is computed based on the acquired record information in the move record computation section 3g, and the process proceeds to Step S612. At Step S612, the computed move record is sent to the management system 2 through the wireless Personal Area Network section 3c by the data control section 3d, and the process is terminated. Furthermore, a flow of the sending process of the record information in the data communication system 3 will be described with reference to FIG. 15. FIG. 15 shows a flow chart illustrating the sending process of the record information in the data communication system 3.

As shown in FIG. 15, at Step S700, it is judged in the data control section 3d whether an acquisition request of the record information has been received or not, and if judged as having been received (Yes), the process proceeds to Step S702, and if not (No), the process waits until the acquisition request has been received. At Step S702, the received acquisition request is analyzed in the data control section 3d, and the process proceeds to Step S704. It is detected by this analysis result whether the acquisition request was the one sent from the management system 2 or the one sent from the data communication system 3 that is selected as the representative.

At Step S704, in the data storage section 3e, it is judged whether the record information of the designated book, corresponding to the acquisition request, is included or not, and if judged as being contained (Yes), the process proceeds to Step S706, and if not (No), the process is terminated. At Step S706, the corresponding record information is read out from the memory by the data storage section 3e, and the process proceeds to Step S708.

Figure 16A:
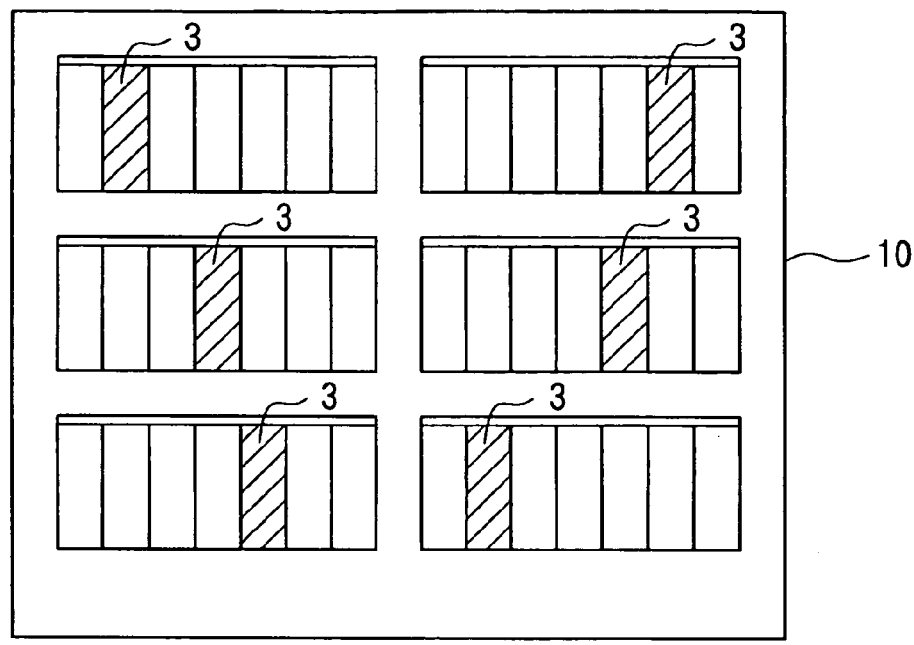
FIGS. 16(A) and 16(B) show an example of an arrangement position of the data communication system 3 in the bookshelf 10.
Figure 16B:
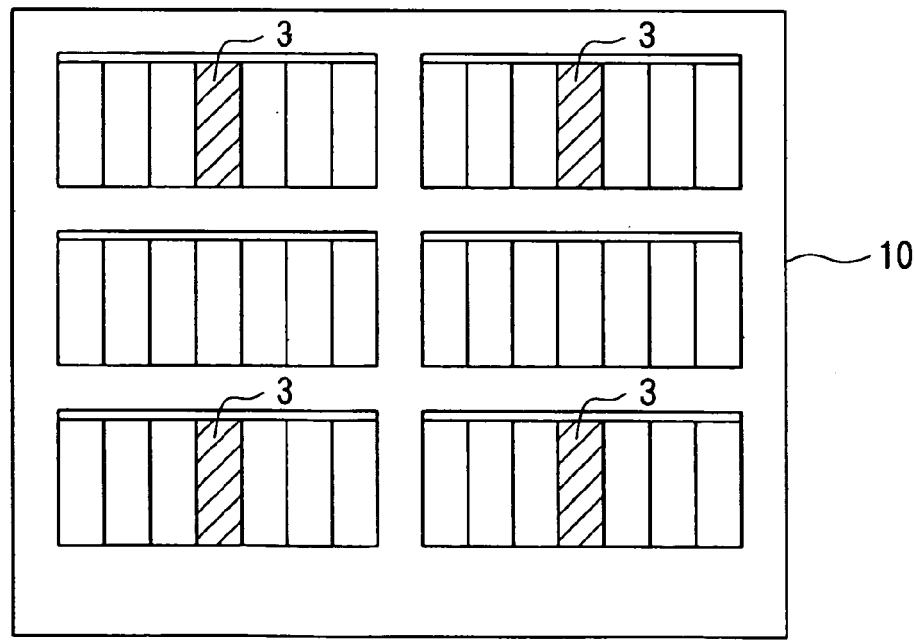

At Step S708, the read-out record information is sent to the system of the sending source of the acquisition request through the wireless Personal Area Network section 3c by the data control section 3d, and the process is terminated. Furthermore, the arrangement work of the data communication systems 3 in the bookshelf 10 will be described with reference to FIGS. 16(A) and 16(B). FIGS. 16(A) and 16(B) show an example of the arranged positions of the data communication systems 3 in the bookshelf 10.

In the position information management system 1 according to the present embodiment, even if the data communication system 3 does not have position information, position information can be computed by a relative position to the contactless identification tag 4. Accordingly, the data communication system 3 can demonstrate the function thereof even if arranged in any position in the bookshelf 10 as shown in FIGS. 16(A) and (B), as long as not arranged in an extreme place.

Moreover, if the data communication system 3 is provided so that the communication range of the data communication system 3 can cover all the contactless identification tags 4 attached to the books stored in the bookshelf 10, the data communication system 3 does not need to be provided in every storing block, and only a required number of sets may be provided (one set may be good enough depending on the case) as shown in FIG. 16(B).

As described above, the data communication system 3 that is selected as the representative acquires the direction information where the contactless identification tag 4 exists and the distance information to the contactless identification tag 4, from other data communication systems 3, as each identification information and communication status information between the data communication system 3 and the contactless identification tag 4 attached to the book. The position information of the contactless identification tag 4 can be computed based on this information, and thereby the position information of the book can be determined.

Moreover, the data communication system 3 is made to store and retain the time information when the existence of the contactless identification tag 4, which exists within the communication range of its own data communication system 3, was detected, and its identification information, by the data storage section 3e. Therefore, the management system 2 or the data communication system 3 that is selected as the representative can acquire this information which each data communication system 3 retains, and can compute the move record of the designated book based on this information.

The data communication system selection section 2a shown in FIG. 4 corresponds to the data communication system selection device according to the eighth, twelfth and thirteenth embodiments. The sending processing of the search request by the information management section 2b and the data communication section 2c corresponds to the acquisition request sending device according to the eighth and twelfth embodiments. The processing to acquire the record information from the data communication system 3 by the information management section 2b and the data communication section 2c corresponds to the second retained-contents acquisition device according to the ninth embodiment. The move record computation section 2d corresponds to the second move record computation device according to the ninth embodiment. The sending processing of the electromagnetic wave for power supply by the data control section 3d and the data sending section 3b shown in FIG. 5 corresponds to the sending device of electromagnetic wave for power supply according to the first and eleventh embodiments. The receiving processing of the response (including the identification information) from the contactless identification tag 4 by the data control section 3d and the data receiving section 3a corresponds to the identification information acquisition device according to the first and the eleventh embodiments.

The sending processing of the identification information of its own data communication system 3 by the data control section 3d and the wireless Personal Area Network section 3c, and the identification information of the contactless identification tag 4 that responded, corresponds to the information sending device according to the first and the eleventh embodiments. The acquisition processing of the identification information of the data communication system 3 and the identification information of the contactless identification tag 4 that responded to the data communication system 3 by the data control section 3d and the wireless Personal Area Network section 3c from other data communication systems 3 corresponds to the information acquisition device according to the first, second, and eleventh embodiments. The position information computation section 3g corresponds to the position information computation device according to the first through third, tenth, eleventh, and thirteenth embodiments. The sending processing of the direction information and the distance information by the data control section 3d and the wireless Personal Area Network section 3c corresponds to the communication status information sending device according to the third and thirteenth embodiments.

The estimation processing of the direction information on the contactless identification tag 4 by the data control section 3d corresponds to the direction estimation device according to the fifth embodiment. The storage retention processing of the record information by the data storage section 3e corresponds to the information retention device according to the sixth, seventh, and ninth embodiments. The acquisition processing of the record information from other data communication systems 3 by the data control section 3*d* and the wireless Personal Area Network section 3*c* corresponds to the first retained-contents acquisition device according to the seventh embodiment. The sending processing of the record information on other data communication systems 3 by the data control section 3*d* and the wireless Personal Area Network section 3*c* corresponds to the first retained-contents sending device according to the seventh embodiment. The move record computation section 3*g* corresponds to the first move record computation device according to the seventh embodiment. The sending processing of the record information to the management system 2 by the data control section 3*d* and the wireless Personal Area Network section 3*c* corresponds to the second retained-contents sending device according to the ninth embodiment.

The sending processing of the position information to the management system 2 by the data control section 3*d* and the wireless Personal Area Network section 3*c* corresponds to the position information sending device according to the eighth and thirteenth embodiments. The power generation section 4*e* shown in FIG. 6 corresponds to the power for the drive generation device according to the first and tenth embodiments. The receiving processing of the response request by the loop antenna 4*f*, the data receiving section 4*b* and the data control section 4*c* corresponds to the acquisition request receiving device according to the first and tenth embodiments. The response processing to the response request by the loop antenna 4*f*, the data sending section 4*a* and the data control section 4*c* corresponds to the identification information sending device according to the first and tenth embodiments.

In addition, although in the above-described embodiments, the position information of the contactless identification tag 4 is computed based on the direction information of the contactless identification tag 4 against the data communication system 3 and the distance information between the data communication system 3 and the contactless identification tag 4, other than this, the mutual direction and the mutual distance may be measured or estimated by the mutual communication between the data communication systems 3, and the position of the contactless identification tag 4 may be computed also based on this information.

Moreover, although in the above-described embodiments, an example of applying the position information management system 1 according to the present invention to the library has been described, other than this, the present invention may be applied to other fields, such as merchandise management of a shop in a supermarket or a department store, and management of car position information in a parking lot.

What is claimed is:

1. A contactless data communication system, comprising:
a contactless identification tag having tag identification information inherent to the contactless identification tag and comprising:
a drive power generation means to generate drive power from an electromagnetic wave used for a power supply sent from a data communication system;
an acquisition request receiving means to receive an acquisition request of the tag identification information from the data communication system; and
an identification information sending means to send the tag identification information to the data communication system in response to the acquisition request of the tag identification information received by the acquisition request receiving means;
the data communication system having a data communication system information inherent to the data communication system, the data communication system further comprising:
an electromagnetic wave sending means for supplying power, which sends the electromagnetic wave used for the power supply to the contactless identification tag;
an identification information acquisition means to acquire the tag identification information from the contactless identification tag existing within an area where communication is made;
an information sending means to send the data communication system information inherent to the data communication system and the tag identification information acquired by the identification information acquisition means to other data communication systems;
an information acquisition means to acquire the data communication system information inherent to the other data communication systems and the tag identification information acquired in the other data communication systems from the other data communication systems; and
a position information computation means to compute position information of the contactless identification tag based on the data communication system information and the tag identification information acquired from the other data communication systems, and not acquired from the data communication system being used to compute position information of the contactless tag.

2. The contactless data communication system according to claim 1, wherein a specific data communication system, which is selected among the data communication system and the other data communication systems, acquires the data communication system information inherent to the other data communication systems and the tag identification information acquired in the other data communication systems from other data communication systems by the information acquisition means, and computes the position information of the contactless identification tag based on the data communication system information and the tag identification information acquired from the other data communication systems by the position information computation means.

3. The contactless data communication system according to claim 2, wherein the data communication system further comprises a communication status information sending means to send communication status information indicating a predetermined communication status of the data communication system and the contactless identification tag to the specific data communication system, and the position information computation means computes the position information of the contactless identification tag based also on the communication status information sent by the communication status information sending means.

4. The contactless data communication system according to claim 3, wherein the communication status information is a radio field intensity of the electromagnetic wave received from the contactless identification tag.

5. The contactless data communication system according to claim 4, wherein the data communication system further comprises a direction estimation means to estimate a direction where the contactless identification tag exists based on the radio field intensity of the electromagnetic wave received from the contactless identification tag, and the communication statue information sending means sends direction information estimated by the direction estimation means as the communication status information to the specific data communication system.

6. The contactless data communication system according to claim 2, wherein the data communication system further comprises a communication status information sending device to send communication status information indicating a predetermined communication status of the data communication system and the contactless identification tag to the specific data communication system, and the position information computation device computes the position information of the contactless identification tag based also on the communication status information sent by the communication status information sending device.

7. The contactless data communication system according to claim 1, wherein the data communication system further comprises an information retention means to retain time information and the tag identification information of the contactless identification tag existing within a communication range of the data communication system.

8. The contactless data communication system according to claim 7, wherein the data communication system further comprises:
a first retained-contents acquisition means to acquire retained contents of the information retention means from the other data communication systems;
a first retained-contents sending means to send the retained contents to the other data communication systems in response to an acquisition request of the retained contents from other data communication systems; and
a first move record computation means to compute a move record of the contactless identification tag based on the retained contents acquired from the other data communication systems by the first retained-contents acquisition means when the data communication system is selected as a specific data communication system.

9. A position information management system to manage position information of a predetermined article in the contactless data communication system according to claim 1, comprising:
a management system for managing position information of a predetermined article so as to enable data communication with the data communication system and the other data communication systems;
a data communication system selection means to select a specific data communication system among the data communication system and the other data communication systems; and
an acquisition request sending means to send an acquisition request of position information of the predetermined article to the specific data communication system selected by the data communication system selection means, and the specific data communication system is constituted as to compute the position information of the contactless identification tag based on the data communication system information acquired from the other data communication systems and the tag identification information of the contactless identification tag that is associated with the predetermined article of the acquisition request, in response to the acquisition request sent from the management system, by the position information computation means, and includes a position information sending means to send position information computed by the position information computation means to the management system.

10. The position information management system according to claim 9, wherein the management system comprises a second retained-contents acquisition means to acquire retained contents of an information retention means from the data communication system, and a second move record computation means to compute a move record of the contactless identification tag based on the retained contents acquired from the data communication system, and the data communication system comprises a second retained-contents sending means to send the retained contents to the management system in response to an acquisition request of the retained contents.

11. A data communication system, comprising:
data communication system information that is identification information inherent to the data communication system;
an electromagnetic wave sending means for supplying power, which sends electromagnetic wave used for a power supply to a contactless identification tag;
an identification information acquisition means to acquire tag identification information from the contactless identification tag existing within an area where communication is made;
an information sending means to send the data communication system information inherent to the data communication system and the tag identification information acquired by the identification information acquisition means to other data communication systems;
an information acquisition means to acquire the data communication system information inherent to the other data communication systems and the tag identification information acquired in the other data communication systems from the other data communication systems; and
a position information computation means to compute position information of the contactless identification tag based on the data communication system information and the tag identification information acquired from other data communication systems, and not acquired from the data communication system being used to compute position information of the contactless tag.

12. The data communication system according to claim 11, further comprising:
a data communication system selection means to select a specific data communication system among the data communication system and the other data communication systems; and
an acquisition request sending means to send an acquisition request of position information of a predetermined article to the specific data communication system selected by the data communication system selection means.

13. The data communication system according to claim 12, wherein when selected as the specific data communication system by the data communication system selection means, the data communication system computes position information of the contactless identification tag based on the data communication system information acquired from other data communication systems and the tag identification information of the contactless identification tag that is associated to the predetermined article of the acquisition request, in response to the acquisition request sent from a management system, by the position information computation means, and includes a position information sending means to send the position information computed by the position information computation means to the management system.

14. A computer readable medium having a program controlling a data communication system, comprising:
   a sending step of an electromagnetic wave used for a power supply, which sends an electromagnetic wave used for a power supply to a contactless identification tag;
   an identification information acquisition step to acquire tag identification information from the contactless identification tag existing within an area where communication can be made;
   an information sending step to send data communication system information inherent to a data communication system and the tag identification information acquired to other data communication systems at the identification information acquisition step;
   an information acquisition step to acquire the data communication system information inherent to the other data communication systems and the tag identification information acquired in the other data communication systems from the other data communication systems; and
   a position information computation step to compute position information of the contactless identification tag based on the data communication system information and the tag identification information acquired from other data communication systems, and not acquired from the data communication system being used to compute position information of the contactless tag.

15. A computer readable medium having a program controlling a management system according to claim 14, comprising:
   a data communication system selection step to select a specific data communication system among the data communication system and the other data communication systems; and
   an acquisition request sending step to send an acquisition request of position information of a predetermined article to the specific data communication system selected at the data communication system selection step.

16. A computer readable medium having a program controlling the data communication system according to claim 15, wherein when selected as a specific data communication system at the data communication system selection step, the program for controlling the data communication system computes position information of the contactless identification tag based on the data communication system information acquired from other data communication systems and the tag identification information of the contactless identification tag that is associated to the predetermined article of the acquisition request, in response to the acquisition request sent from a management system, at the position information computation step, and includes a position information sending step to step the position information computed at the position information computation step to the management system.

17. A contactless data communication system, comprising:
   a contactless identification tag having tag identification information inherent to the contactless identification tag and comprising:
   a drive power generation device to generate drive power from an electromagnetic wave used for a power supply sent from a data communication system;
   an acquisition request receiving device to receive an acquisition request of the tag identification information from the data communication system; and
   an identification information sending device to send the tag identification information to the data communication system in response to the acquisition request of the tag identification information received by the acquisition request receiving device;
   the data communication system having a data communication system information inherent to the data communication system, the data communication system further comprising:
   an electromagnetic wave sending device for supplying power, which sends the electromagnetic wave used for the power supply to the contactless identification tag;
   an identification information acquisition device to acquire the tag identification information from the contactless identification tag existing within an area where communication is made;
   an information sending device to send the data communication system information inherent to the data communication system and the tag identification information acquired by the identification information acquisition means to other data communication systems;
   an information acquisition device to acquire the data communication system information inherent to the other data communication systems and the tag identification information acquired in the other data communication systems from the other data communication systems; and
   a position information computation device to compute position information of the contactless identification tag based on the data communication system information and the tag identification information acquired from the other data communication systems, and not acquired from the data communication system being used to compute position information of the contactless tag.

18. The contactless data communication system according to claim 17, wherein a specific data communication system, which is selected among the data communication system and the other data communication systems, acquires the data communication system information inherent to the other data communication systems and the tag identification information acquired in the other data communication systems from other data communication systems by the information acquisition device, and computes the position information of the contactless identification tag based on the data communication system information and the tag identification information acquired from the other data communication systems by the position information computation device.

* * * * *